(12) United States Patent
Saito et al.

(10) Patent No.: US 6,906,152 B2
(45) Date of Patent: Jun. 14, 2005

(54) RUBBER COMPOSITIONS

(75) Inventors: Akira Saito, Fujisawa (JP); Haruo Yamada, Yokohama (JP); Yasunobu Nakafutami, deceased, late of Kawasaki (JP); by Hiromi Nakafutami, legal representative, Kawasaki (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 73 days.

(21) Appl. No.: 10/383,542

(22) Filed: Mar. 10, 2003

(65) Prior Publication Data

US 2003/0199669 A1 Oct. 23, 2003

Related U.S. Application Data

(62) Division of application No. 09/856,845, filed as application No. PCT/JP00/06600 on Sep. 26, 2000.

(30) Foreign Application Priority Data

Sep. 27, 1999 (JP) ............................................ 11-272070
Sep. 27, 1999 (JP) ............................................ 11-272090

(51) Int. Cl.$^7$ ............................... C08F 2/04; C08F 8/30
(52) U.S. Cl. ........................ 526/77; 526/912; 525/113; 525/122; 525/331.9; 525/333.2
(58) Field of Search ................... 526/77, 912; 525/113, 525/122, 331.9, 333.2

(56) References Cited

U.S. PATENT DOCUMENTS 3,442,878 A * 5/1969 Gippin ......................... 526/77
4,252,925 A * 2/1981 Fukuda et al. ................ 526/77
4,914,248 A * 4/1990 Kitagawa et al. ........... 525/113
5,804,644 A   9/1998 Nakafutami et al.

FOREIGN PATENT DOCUMENTS

| EP | 0 903 373 A1 | 3/1999 |
| JP | A7 330959 | 12/1995 |
| JP | A10 292068 | 11/1998 |

* cited by examiner

*Primary Examiner*—Fred Teskin
(74) *Attorney, Agent, or Firm*—Birch, Stewart, Kolasch & Birch, LLP

(57) ABSTRACT

The present invention provides a diene rubber composition having excellent processability and being improved in both the balance between low rolling resistance and wet skid resistance, and strength properties. The composition according to the invention is a diene polymer rubber composition comprising (A) 100 parts by weight of a raw material rubber comprising (A-1) a diene rubbery polymer which is a conjugated diene rubbery polymer or a conjugated diene-styrene rubbery copolymer (1) containing a modified component in an amount exceeding 60 wt. %, which modified component is obtained by reacting an active end of the rubbery polymer with a polyfunctional compound having, in its molecule thereof, at least two epoxy groups, (2) having a molecular weight distribution Mw/Mn of 1.05 to 3.0, and (3) having a weight-average molecular weight of 100,000 to 2,000,000; and, based on 100 parts of the component (A), (B) 1 to 100 parts by weight of a rubber extension oil, (C) 25 to 100 parts by weight of reinforcing silica, and (D) 1.0 to 20 parts by weight in total of a vulcanizing agent and a vulcanizing accelerator.

8 Claims, No Drawings

RUBBER COMPOSITIONS

This application is a divisional of co-pending application Ser. No. 09/856,845, filed on Oct. 29, 2001 and for which priority is claimed under 35 U.S.C. § 120. Application Ser. No. 09/856,845 is the national phase of PCT International Application No. PCT/JP00/06600 filed on Sep. 26, 2000 under 35 U.S.C. § 371. The entire contents of each of the above-identified applications are hereby incorporated by reference. This application also claims priority of Application Nos. JP 11-272070 and JP 11-272090 both filed in Japan on Sep. 27, 1999 under 35 U.S.C. § 119.

TECHNICAL FILED

The present invention relates to a conjugated-diene-rubber-containing rubber composition which has improved processability even if containing silica as a filler, and also has excellent hysteresis loss properties and strength properties. More specifically, the invention pertains to a novel conjugated diene polymer rubber composition available by adding, to a diene rubber which has acquired a specific structure and has improved affinity with silica by modifying a conjugated diene rubbery polymer having an active end with an epoxy polyfunctional compound, an oil, silica, a vulcanizing agent and a vulcanizing accelerator and kneading the mixture. The vulcanizate thereof is suitably used for applications, mainly, tires for which a conjugated diene polymer rubber composition has conventionally been used.

BACKGROUND ART

In recent years, there has been a strong social demand for reducing the amount of a CO2 exhaust gas for resource saving, energy saving and environmental protection. In order to reduce the amount of a CO2 gas discharged from automobiles, various countermeasures such as weight reduction of them or use of electric energy are under investigation. As a common theme in automobiles, an improvement of fuel-cost-saving performance by improving the rolling resistance of a tire is regarded to be necessary. At the same time, automobiles are desired to have improved safety upon traveling. Such fuel-cost-saving performance and safety of automobiles are largely influenced by the performances of tires used therefor so that there is a strong demand for improving fuel-cost-saving performance, traveling stability and durability of automobile tires. Such properties of tires depend on various factors including structure and raw materials used for them. In particular, the performances of a rubber composition used for the tread part of a tire to be brought into contact with a road surface largely affects the properties of a tire such as fuel-cost-saving performance safety and durability. Under such situations, technical improvements in a tire rubber composition are now frequently studied and proposed and some have already been industrialized.

A tire tread is requested to have, for example, a small hysteresis loss for improving its fuel-cost-saving performance, have high wet skid resistance for improving its controlling stability and have excellent wear resistance for improving its durability. However, a reduction in hysteresis loss and high wet skid resistance are not attained simultaneously, which also applies to the relationship between wear resistance and wet skid resistance. It is difficult to satisfy all the above-described demands for an automobile tire by improving only one performance and an improvement of their balance is important. Typical methods for improving a tire rubber composition is to improve raw materials to be employed. An improvement in the polymer structure of a raw material rubber such as SBR or BR or improvement in the structure or composition of a reinforcing filler such as carbon black or silica, vulcanizing agent or plasticizer has now been carried out.

One of the most attractive techniques among them in recent years is to use silica as a reinforcing filler instead of conventionally employed carbon black. The typical technique of it is proposed, for example, in U.S. Pat. No. 5,227,425 wherein the balance of a tread rubber composition between a fuel-cost-saving performance and wet skid resistance is improved by adding, to SBR of a specific structure, silica as a reinforcing filler and kneading the mixture under specified conditions. A rubber composition using silica as a reinforcing filler however involves some problems to be solved. For example, since silica has low affinity with a rubber compared with the conventionally employed carbon black, its dispersibility in the rubber is not always good and this inferior dispersibility tends to cause insufficient wear resistance and insufficient strength properties. It is therefore necessary to improve the dispersibility of silica by kneading under particular temperature conditions in the presence of a silane coupling agent typified by bis-(triethoxysilylpropyl)-tetrasulfide and in addition, increasing a kneading frequency.

Under such situations, a method of modifying the end of a rubber with an alkoxysilyl group and silica-containing rubber compositions prepared thereby are proposed in JP-B-62-227908, JP-B-8-53513, JP-B-8-53576 and JP-B-9-225324 with a view to improving the dispersibility of silica in the rubber and reducing the amount of the silane coupling agent. The polymer modified by an alkoxysilyl group is available by reacting an active end polymer, which has been obtained by anionic polymerization, with a specific alkoxysilane compound. Such a polymer is however accompanied with the problems that the alkoxysilyl group of the resulting polymer tends to be condensed by water content, thereby causing a change in the viscosity of the polymer with the passage of time and in spite of an improvement in the dispersibility of silica, the resulting rubber composition has not always good processability owing to an increase in its viscosity.

A silica-containing composition using an epoxydated polymer is proposed in JP-B-9-118785 and JP-B-9-221429. It is however accompanied with the problems that it needs a special epoxidation step with hydrogen peroxide or peracid upon obtaining a modified polymer and in addition, it has not always good processability.

In JP-B-7-330959, proposed is a tire tread composition using SBR of a special structure, which has been obtained by coupling with a diglycidylamino-containing polyfunctional compound, with a view to improving processability in production steps, reducing rolling resistance and improving wet skid resistance. In this case, incorporation of carbon black in at least a predetermined amount is required in order to impart the composition with performances such as processability and wear resistance and to suppress radio frequency noise. It is further disclosed that the molecular weight distribution of the polymer falls within a specific range, the styrene content and 1,2-bond content, each within a specific range are preferred, and at least one unreacted glycidyl group is preferably contained in the molecule.

An object of the present invention is to provide, in consideration of such situations, a silica-containing diene rubber composition which has excellent processability even if a content of carbon black is small and is improved in both the balance between low rolling resistance and wet skid resistance and strength properties.

DISCLOSURE OF THE INVENTION

With a view to attaining the above-described object, the present inventors have carried out an extensive investigation on the molecular structure and modified structure of a diene polymer and a manufacturing process of it. As a result, it has been found that a rubbery polymer containing a predetermined amount of a specific modified component has excellent performances, leading to the completion of the invention.

Described specifically, the object of the present invention is attained by provision of the following diene rubber polymer compositions and diene rubber polymer vulcanizates:

1. A diene polymer rubber composition comprising:
   (A) 100 parts by weight of a raw material rubber comprising (A-1) a diene rubbery polymer which is a conjugated diene rubbery polymer or a conjugated diene-styrene rubbery copolymer, said diene rubbery polymer
      (1) containing a modified component in an amount exceeding 60 wt. %, which modified component is obtained by reacting an active end of the rubbery polymer with a polyfunctional compound having, in its molecule thereof, at least two epoxy groups,
      (2) having a molecular weight distribution Mw/Mn of 1.05 to 3.0, and
      (3) having a weight-average molecular weight of 100,000 to 2,000,000; and, based on 100 parts by weight of the component (A),
   (B) 1 to 100 parts by weight of a rubber extension oil;
   (C) 25 to 100 parts by weight of reinforcing silica; and
   (D) 1.0 to 20 parts by weight in total of a vulcanizing agent and a vulcanizing accelerator.

2. The diene polymer rubber composition according to item 1 above, wherein the polyfunctional compound further has at least one nitrogen-containing group.

3. The diene polymer rubber composition according to item 1 above, wherein the polyfunctional compound is represented by the following formula:

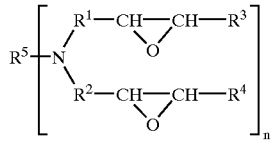

wherein $R^1$ and $R^2$ each independently represents a $C_{1-10}$ hydrocarbon group or a $C_{1-10}$ hydrocarbon group having at least one group selected from ethers and tertiary amines, $R^3$ and $R^4$ each independently represents hydrogen, a $C_{1-20}$ hydrocarbon group or a $C_{1-20}$ hydrocarbon group having at least one group selected from ethers and tertiary amines, $R^5$ represents a $C_{1-20}$ hydrocarbon group, a $C_{1-20}$ hydrocarbon group having at least one group selected from ethers, tertiary amines, epoxy, carbonyl and halogens, and n stands for 1 to 6.

4. The diene polymer rubber composition according to item 3 above, wherein the polyfunctional compound has, in its molecule thereof, at least one diglycidylamino group.

5. The diene polymer rubber composition according to item 1 above, wherein the content of the modified component of the component (A-1) has been analyzed by chromatography.

6. The diene polymer rubber composition according to item 1 above, further containing 0.1 to 20 wt. %, based on the weight of the component (C), of (E) an organosilane coupling agent.

7. The diene polymer rubber composition according to item 1 above, which further contains (F) 0.1 to 100 parts by weight of carbon black, the total amount of the components (C) and (E) being from 30 to 150 parts by weight.

8. The diene polymer rubber composition according to item 7 above, wherein the amount of the component (F) is 0.1 parts by weight or greater but less than 25 parts by weight.

9. The diene polymer rubber composition according to item 1 above, wherein the component (A-1) has a molecular weight distribution Mw/Mn (2) of 1.05 or greater but less than 2.2.

10. The diene polymer rubber composition according to item 1 above, wherein the component (A) comprising 15 to 99 wt. % of the component (A-1) and 1 to 85 wt. % of component (A-2) which is a vulcanizable rubbery polymer other than the component (A-1).

11. R diene polymer rubber vulcanizate obtained by:
   conducting initial kneading, at least once under the conditions permitting kneading discharging temperature of 135 to 180° C., of an initial kneading component comprising:
   (A) 100 parts by weight of a raw material rubber comprising (A-1) a diene rubbery polymer which is a conjugated diene rubbery polymer or a conjugated diene-styrene rubbery copolymer, said diene rubbery polymer
      (1) containing a modified component in an amount exceeding 60 wt. %, which modified component is obtained by reacting an active end of the rubbery polymer with a polyfunctional compound having, in its molecule thereof, at least two epoxy groups,
      (2) havaing a molecular weight distribution of Mw/Mn of 1.05 to 3.0, and
      (3) having a weight-average molecular weight of 100,000 to 2,000,000; and, based on 100 parts by weight of the component (A),
   (B) 1 to 100 parts by weight or a rubber extension oil; and
   (C) 25 to 100 parts by weight of reinforcing silica, to thereby obtain an initial kneaded mass having a rubber bound content after kneading of 30 to 70 wt. %;
   adding, to 100 parts by weight of the component (A), (D) 1.0 to 20 parts by weight in total of a vulcanizing agent and a vulcanizing accelerator; and
   kneading the resulting mixture to give a kneading discharging temperature of 120° C. or less, thereby vulcanizing.

12. The diene polymer rubber vulcanizate according to item 11 above, wherein the initial kneading component further contains at least one of 0.1 to 20 wt. % of (E) an organosilane coupling agent based on the weight of the component (C) and 0.1 to 100 parts by weight of (F) carbon black based on 100 parts by weight of the component (A).

13. The diene polymer rubber vulcanizate according to item 11 above, wherein the component (A) comprises 15 to 99 wt. % of the component (A-1) and (A-2) 1 to 85 wt. % of a vulcanizable rubbery polymer other than the component (A-1).

14. The diene polymer rubber vulcanizate according to item 12 above, wherein the amount of the component (E) is 0.1 wt. % or greater but less than 6 wt. % based on the amount of the component (C).

15. The diene polymer rubber vulcanizate according to item 11 above, wherein initial kneading is carried out to give the below-described kneading discharging temperature (Td) depending on a heating loss (Mo) of the component (C).
   1) $135 \leq Td \leq 180°$ C. when $1\% \leq Mo \leq 4\%$
   2) $(15 \times Mo+75)°$ C. $< Td \leq 180°$ C. when $4\% < Mo \leq 6\%$ and
   3) $165°$ C. $< Td \leq 180°$ C. when $6\% < Mo \leq 10\%$.

BEST MODE FOR CARRYING OUT THE INVENTION

The present invention will hereinafter be described more specifically.

For the vulcanized rubber composition of the present invention, a specific rubbery polymer (Component (A-1)) is used as a rubbery polymer. The specific rubbery polymer (Component (A-1)) of the invention is a specific conjugated diene rubbery polymer or conjugated diene-styrene rubbery copolymer and it contains, in an amount exceeding 60 wt. %, a modified component obtained by reacting, in an inert solvent, an active-end-having conjugated diene rubbery polymer or conjugated diene-styrene rubbery copolymer available by anionic polymerization with a polyfunctional compound having, in the molecule thereof, at least two epoxy groups.

In the present invention, preferred examples of the conjugated diene of the conjugated diene rubbery polymer or conjugated diene-styrene rubbery copolymer include 1,3-butadiene and isoprene. Styrene to be copolymerized is preferably a random copolymer. The "random copolymer" as used herein does not contain a component having a styrene chain length of 30 or greater, or if any, contains it in a small amount. Described specifically, preferred is a random copolymer having such a component in an amount of 10 wt. % or less, preferably 5 wt. % or less based on the amount of the polymer as analyzed by a known method wherein the polymer is decomposed by the Kolfthoff's method and the amount of polystyrene unnecessary for methanol is analyzed; or a random copolymer containing a component whose styrene chain length is 8 or greater in an amount of 5 wt. % or less relative to the amount of the polymer as analyzed by a known method wherein the polymer is decomposed by the method employed for ozone decomposition and the styrene chain distribution is analyzed by GPC. As needed, it may be copolymerized with 10 wt. % or less of another copolymerizable monomer.

In this manufacturing method of the rubbery polymer, examples of the inert solvent include saturated hydrocarbons and aromatic hydrocarbons, more specifically, aliphatic hydrocarbons such as butane, pentane, hexane, pentane and heptane, alicyclic hydrocarbons such as cyclopentane, cyclohexane, methylcyclopentane and methylcyclohexane and aromatic hydrocarbons such as benzene, toluene and xylene and hydrocarbons as a mixture thereof.

As a polymerization initiator, an anionic polymerization initiator is employed. Preferred are organic alkali metal compounds and organic alkaline earth metals, of which the organolithium compounds are particularly preferred. Examples of the organolithium compounds include those containing any one of organolithium polymerization initiator having polymerization initiating capacity and having a low molecular weight, organolithium compounds of a solubilized oligomer, those having, in one molecule thereof, one lithium or plural lithiums and those having, in the bonding manner of an organic group and lithium, a carbon-lithium bond, a nitrogen-lithium bond or a tin-lithium bond. Specific examples include monoorganolithium compounds such as n-butyl lithium, sec-butyl lithium, t-butyl lithium, n-hexyl lithium, benzyl lithium, phenyl lithium and stilbene lithium; polyfunctional organolithium compounds such as 1,4-dilithiobutane, reaction product of sec-butyl lithium and diisopropylbenzene, 1,3,5-trilithiobenzene, reaction product of n-butyl lithium, 1,3-butadiene and divinylbenzene, reaction product of n-butyl lithium and polyacetylene compound, and compounds having a nitrogen-lithium bond such as dimethylaminolithium, dihexylaminolithium and hexamethyleneiminolithium, of which the n-butyl lithium and se-butyl lithium are particularly preferred. These organolithium compounds may be used either singly or in combination. In the polymerization reaction, it is possible to add an aprotic polar compound, for example, an ether such as diethyl ether, diethylene glycol dimethyl ether, tetrahydrofuran or 2,2-bis(2-oxolanyl)propane, or an amine such as triethylamine or tetramethylethylene diamine in order to randomly copolymerize styrene with a conjugated diene.

The polymerization reaction is conducted under the ordinarily employed conditions, for example, at a polymerization temperature of 20 to 150° C. and at a final polymer concentration ranging from 5 to 30 wt. %. The polymerization temperature is controlled by the feed temperature of a monomer or solvent, concentration of the monomer or cooling or heating from the outside of a reactor.

The rubbery polymer to be used in the invention must contain, in an amount exceeding 60 wt. %, a modified component available by reacting a diene polymer having an active end with a polyfunctional compound having, in the molecule thereof, at least 2 epoxy groups.

To industrially produce such a rubbery polymer having a high modification ratio, it is necessary to efficiently prepare, prior to the modification reaction, a diene polymer having an active end by the well controlled method. An industrially available monomer or solvent usually contains various harmful impurities. When they react with the active end of the polymer during polymerization, thereby causing a terminating reaction or transferring reaction, the active end of the polymer decreases, which makes it difficult to produce the polymer of the present invention containing a modified component in an amount exceeding 60 wt. %. Particularly upon polymerization at a temperature as high as 80° C. or greater, influence of impurities such as alkene, acetylene or water cannot be neglected. It is necessary to feed a polymerization reactor with a monomer and a solvent each containing less impurities and to control the polymerization temperature in order to produce a diene polymer having the structure as specified by the invention.

In the invention, the amount of all the impurities in the monomer and solvent to be fed to the polymerization reactor must be reduced to less than 0.40 equivalent, preferably 0.30 equivalent or less based on an initiator to be fed to the polymerization reactor. Specific examples of the impurities in the conjugated diene monomer include compounds reactive with plural moles of an organic alkali metal such as vinyl acetylene, 1,2-butadiene or butin-1, and compounds reactive with an equimolar amount of an organic alkali metal such as aldehyde; those of the impurities in the styrene monomer include compounds reactive with an equimolar amount of an organic alkali metal such as phenylacetylene and benzaldehyde; and those of the impurities common to various monomers and solvents include compounds reactive with 2 moles of an organic alkali metal such as TBC, a short stop and compounds reactive with an equimolar amount of an organic alkali metal such as water. In the invention, it is preferred to conduct calculation with regards to the compound to be reacted with plural moles of the organic alkali metal, supposing that the compound is reacted with two moles of the organic alkali metal.

To lessen the influence of such impurities, use or a raw material containing impurities as less as possible is of course preferred, but practically, it is the common practice to use a raw material containing impurities and remove them by the chemical engineering method such as distillation or adsorption. Such a method is however not sufficiently effective and it takes a tremendous cost to obtain sufficient effects. Even a trace amount of impurities adversely affects the present invention because the molecular weight is which so that as a method for reducing the influence of impurities more than usual, reaction of them, prior to feeding the polymerization reactor with a monomer and a solvent, with an organic metal compound in an amount corresponding to impurities, more specifically, with a polymerization catalyst, thereby substantially inactivating the impurities is preferred. Single use or combination of the above-described methods makes it possible to largely lower deactivation of the active end due to the impurities contained in the monomer solution to be fed to the polymerization reactor, thereby conducting modification reaction at an industrially advantageous efficiency at a temperature exceeding 80° C., preferably 120° C. or less.

As the modifier to be used for obtaining the polymer of the invention containing the modified component, a polyfunctional compound having, in the molecule thereof, at least two epoxy groups is employed. Any polyfunctional compound having, in the molecule thereof, at least two epoxy groups is usable. Specific examples include polyglycidyl ethers of a polyhydric alcohol such as ethylene glycol diglycidyl ether and glycerin triglycidyl ether, polyglycidyl ethers of an aromatic compound having at least two phenol groups such as diglycidylated bisphenol A, polyepoxy compounds such as 1,4-diglycidylbenzene, 1,3,5-triglycidylbenzene and polyetpoxylated liquid polybutadiene, epoxy-containing tertiary amines such as 4,4'-diglycidyl-diphenylmethylamine and 4,4'-diglycidyl-dibenzylmethylamine, and diglycidylamino compounds such as diglycidyl aniline, diglycidyl orthotoluidine, tetraglycidyl methaxylenediamine, tetraglycidyl-p-phenylenediamine, diglycidyl aminomethylcyclohexane and tetraglycidyl-1,3-bisaminomethylcyclohexane. Preferred are the polyfunctional compounds having, in the molecule thereof, at least two epoxy groups and at least one nitrogen-containing group. More preferred are the polyfunctional compounds of the following formula:

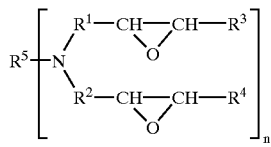

wherein, $R^1$ and $R^2$ each independently represents a $C_{1-10}$ hydrocarbon group or a $C_{1-10}$ hydrocarbon group having an ether or a tertiary amine, $R^3$ and $R^4$ each independently represents hydrogen, a $C_{1-20}$ hydrocarbon group or a $C_{1-20}$ hydrocarbon group having an ether or tertiary amine, $R^5$ represents a $C_{1-20}$ hydrocarbon group or a $C_{1-20}$ hydrocarbon group having at least one group selected from ethers, tertiary amines, epoxy, carbonyl and halogens, and n stands for 1 to 6.

More preferred are the polyfunctional compounds having a diglycidylamino group. The number of the epoxy groups in the molecule must be at least two, preferably at least 3 and more preferably at least 4. Neither polyfunctional compounds having, in the molecule thereof, a functional group which reacts with the active end of the polymer, thereby inactivating it, for example, an active-hydrogen-containing functional group such as hydroxyl, carboxyl or primary or secondary amino group; nor polyfunctional compounds having, in the molecule thereof, a functional group which eliminates an alcohol or amine, such as ether or amide are preferred. The polyfunctional compound may contain a functional group which is reactive with the active end of the polymer and is bonded thereto such as carbonyl or halogen.

The polyfunctional compound having, in the molecule thereof, at least two epoxy groups is preferably reacted with the active end of the polymer so that an amount of the epoxy group of the polyfunctional group to be reacted with the active end of the polymer exceeds 0.6 equivalent and a ratio of the molecule of the polyfunctional compound to the active end of the polymer to be reacted therewith is not greater than 10 times the mole. Below the above-described range, the modified component of the invention does not exceed 60 wt. % in the case of the active end of the polymer obtained by polymerization in the presence of a monofunctional initiator. Above the above-described range, on the other hand, the polyfunctional compound having an unreacted epoxy group increases, resulting in deterioration in the performance.

By the reaction between the active end of the polymer and epoxy group, a hydroxyl group is introduced into the polymer chain. When the epoxy group of the polyfunctional group exceeds 0.6 equivalent but not greater than 1 equivalent of the active end of the polymer, a large portion of the active end of the polymer reacts with the epoxy group of the polyfunctional compound and causes coupling reaction of plural molecules, resulting in the formation of a modified polymer molecule having plural hydroxyl groups. When the epoxy group of the polyfunctional group exceeds 1 equivalent of the active end of the polymer, formed are both the polymer molecule having plural hydroxyl groups and a modified polymer molecule— which contains both a hydroxyl group produced by the reaction of the active end of the polymer with the epoxy group and an unreacted epoxy group in the polyfunctional compound molecule bonded to the polymer—. By the use of a polyfunctional compound having, in the molecule thereof, at least two epoxy groups and at least one nitrogen-containing group, a nitrogen-containing group together with a hydroxyl group formed by the reaction of the active end of the polymer with the epoxy group is introduced.

A specific rubbery polymer to be used in the invention must contain the component, which has been modified by the polyfunctional compound, in an amount exceeding 60 wt. % based on the whole polymer. Preferred is 70 wt. % or greater. The greater the content of the modified component, the better the effects of silica as a filler. The content of the modified component can be measured by chromatography permitting separation of the component into modified one and unmodified one. This chromatography is effected, for example, by using a GPC column which adopts, as a filler, a polar substance such as silica for adsorbing thereto the modified component and determining the amount of the component by using a non-adsorptive component as an internal standard; or by measuring the GPCs of the polymer before and after modification and calculating the amount of the modified portion based on a change in its shape or molecular weight.

The molecular weight distribution Mw/Mn of the rubbery polymer as the component (A-1) to be used in the present invention ranges from 1.05 to 3.0. The molecular weight distribution can be measured using GPC based on the molecular weight of standard polystyrene. Molecular weight distribution less than 1.05 deteriorates processability and at the same time, does not permit easy industrial production. At a molecular weight distribution exceeding 3.0, on the other hand, the rubber composition available from the resulting rubbery polymer has deteriorated mechanical strength.

The polymer having a molecular weight distribution of 2.2 or greater has advantages in excellent processability upon kneading, not a large torque upon processing and short kneading time. When the polymer has a molecular weight distribution less than 2.2, on the other hand, processability is usually inferior. Particularly when silica is incorporated, the torque upon processing becomes large. In such a case, a large amount of carbon black was conventionally used in combination. In the invention, affinity with silica is heightened so that even if the amount of carbon black is small, the processability is excellent; the rubber composition thus obtained is well balanced between low rolling resistance and wet skid resistance; and strength properties are improved.

The rubbery polymer to be used in the invention as the component (A-1) must have a weight-average molecular weight of 100,000 to 2,000,000. The weight-average molecular weight is measured by GPC based on the molecular weight of standard polystyrene. Weight-average molecular weights less than 100,000 deteriorate the strength and wear resistance of the resulting rubber composition, while those exceeding 2,000,000 lower the processability markedly, making it difficult to obtain a rubbery composition.

The Mooney viscosity (MV-M) of the rubbery polymer to be used in the invention as the component (A-1) preferably ranges from 20 to 200. This Mooney viscosity is Mooney viscosity ((ML1+4 (100° C.)) as measured at 100° C. by using a Mooney viscometer specified as standards. When the Mooney viscosity ((ML1+4 (100° C.)) exceeds approximately 150 and cannot be measured easily at 100° C., the viscosity measured, for example, at 130° C. is converted to that at 100° C. Mooney viscosities (MV-M) less than 20 lower the strength and wear resistance of the resulting rubber composition. Those exceeding 200, on the other hand, cause a marked deterioration in the processing performance, making it difficult to produce a rubber composition. Mooney viscosities (MV-M) within 25 to 180 are more preferred.

The rubbery polymer to be used as the component (A-1) of the invention can be provided for practical use as an oil extended rubber produced, for facilitating its processing, by adding 20 to 60 parts by weight of the ordinarily-employed rubber extending oil based on 100 parts by weight of a rubber.

The rubbery polymer to be used as the component (A-1) of the invention preferably has a glass transition point ranging from −100 to 0° C. so that the rubber composition obtained as a final product will exhibit rubber elasticity. That ranging from −95 to −10° C. is more preferred. The range of the glass transition point of the rubbery polymer to be used in the invention is selected depending on the using purpose of the rubber composition. For example, when low-temperature performances are important, a rubbery polymer having a glass transition point within a low temperature range is subjectively selected. When damping capacity is required, a rubbery polymer having a glass transition point within a high temperature range is subjectively selected. The glass transition point can be controlled by the composition of a conjugated diene and styrene constituting the rubbery polymer or by the ratio or the micro-structure (ratio of 1,4-bond to 1,2- and 3,4-bonds) in the polymer chain when the conjugated diene is butadiene or isoprene. When the rubbery polymer of the invention is polybutadiene, the 1,2-bond content of the microstructure of butadiene is preferably 10 to 80%. When the rubbery polymer of the invention is a styrene-butadiene random copolymer, on the other hand, it is preferred that the styrene content is 5 to 45% and the 1,2-bond content of the micro-bond of a butadiene portion is 10 to 70%.

As the rubbery polymer to be used as the component (A-1) of the invention, one or more rubbery polymers may be used. When polybutadiene and a styrene-butadiene copolymer are used in combination, the latter may be a combination of styrene-butadiene copolymer rubbers different in molecular weight-molecular weight distribution or a combination of those different in a glass transition point.

When as a preferred mode of the invention, 10 to 90 parts by weight of a styrene-butadiene copolymer rubber containing a modified component in an amount of 70 wt. % or greater, and having a glass transition point ranging from −80 to −20° C., a molecular weight distribution of 1.05 or greater but less than 2.2, and a Mooney viscosity (ML1+4 (100° C.)) of 20 or greater but less than 100; and 90 to 10 parts by weight of a styrene-butadiene copolymer rubber containing a modified component of 70 wt. % or greater, and having a glass transition point ranging from −50 to −20° C., a molecular weight distribution ranging from 2.2 to 3.0 and a Mooney viscosity (ML1+4 (100° C.)) ranging from 100 to 200 are used as the component (A-1) the resulting rubber composition is excellent in any one of processability, strength properties, and a balance between low rolling resistance and wet skid resistance.

As the component (B), rubber extending oils which contain only a small amount of a polynuclear aromatic component such as MES, T-DAE or T-RAE and therefore are not harmful for environment are usable as well as the conventionally used aromatic, naphthene and paraffin ones. In the invention, the rubber extending oil is used in an amount of 1 to 100 parts by weight based on 100 parts by weight of the raw material rubber. The amount of the rubber extending oil varies depending on the amounts of a reinforcing silica filler and reinforcing carbon black which will be described later and it is used to adjust the elastic modulus of the vulcanized mixture. Amounts of the rubber extending oil exceeding 100 parts by weight deteriorate the hysteresis loss performance and wear resistance of the resulting rubber composition and are therefore not preferred. Amounts of the rubber extending oil ranging from 5 to 60 parts by weight are preferred.

With regards to the component (C) of the present invention, any one of wet-process silica, dry-process silica and synthetic silicate type silica is usable as the reinforcing silica. Silica having a small particle size has high reinforcing effects and grip performance improving effects. Small-particle-size and high aggregation type silica is preferred. The reinforcing silica of the present invention is used as a reinforcing-effect-equipped silica in an amount of 25 to 100 parts by weight based on 100 parts by weight of the raw material rubber. Amounts less than 25 parts by weight deteriorate physical performances including strength, while those exceeding 100 parts by weight lower the rubber performances, for example, cause an excessive increase of hardness or even a deterioration of strength. An amount of the reinforcing silica as component (C) is preferably 30 to 90 parts by weight.

The vulcanizing agent and vulcanizing accelerator as the component (D) of the present invention is used in an amount ranging from 1 to 20 parts by weight based on 100 parts by weight of the rubbery polymer. The typical vulcanizing agent is sulfur. Sulfur-containing compounds and peroxides may also be used. As the vulcanizing accelerator, sulfenamide, guanidine or thiuram one may be used in a necessary amount.

To the rubbery polymer composition of the present invention, an organosilane coupling agent can be added as the component (E). For heightening the coupling action (mutual bonding action) of the reinforcing silica filler with the raw material rubber, this organosilane coupling agent is preferably added in an amount of 0.1 to 20 wt. % based on the amount of the reinforcing silica as the component (C).

Amounts of the organosilane coupling agent exceeding 20 parts by weight impair reinforcing properties. The amount of the organosilane coupling agent preferably ranges from 0.1 wt. % or greater to less than 6 wt. % based on the amount of the reinforcing silica filler.

The organosilane coupling agent has a double bond of the polymer in its molecule and groups having affinity or coupling tendency on the surface of silica. Examples include bis-[3-(triethoxysilyl)-propyl]-tetrasulfide, bis-[3-(triethoxysilyl)-propyl]-disulfide, bis-[2-(triethoxysilyl)-ethyl]-tetrasulfide, 3-mercaptopropyl-trimethoxysilane, 3-triethoxysilylpropyl-N,N-dimethylthiocarbamoyltetrasulfide and 3-triethoxysilylpropylbenzothiazole tetrasulfide. In this invention, the rubbery polymer having a specific modified component has a high bonding performance with the reinforcing silica so that a high-performance rubber composition is available even by not using an organosilane coupling agent or using it in a smaller amount compared with the case wherein another polymer is used.

In the rubber composition of the invention, reinforcing carbon black can be used as the component (F) in an amount with an extent not impairing the performance of the reinforcing silica. Any one of carbon blacks such as FT, SRF, FEF, HAF, ISAF and SAF is usable as the reinforcing carbon black. Carbon black having a nitrogen adsorption specific surface area of 50 mg/g or greater and an DBP oil absorption amount of 80 ml/100 g is preferred. The reinforcing carbon black is added in an amount of 0.1 to 100 parts by weight based on 100 parts by weight of the raw material rubber and total amount of the reinforcing silica (component (C)) and carbon black (component (F)) is preferably 30 to 150 parts by weight. Outside the above-described range, performances of a rubber satisfying the object of the present invention are not attained. The amount of carbon black (component (F)) ranging from 0.1 part by weight or greater to less than 25 parts by weight is more preferred. Amounts within such a range further improve the balance of the resulting rubber composition between low rolling resistance and wet skid resistance.

As the raw material rubber in the present invention, only the component (A-1) can be used, or alternatively, that comprising 15 to 99 wt. % off the component (A-1) and, as a component (A-2), 1 to 85 wt. % of a vulcanizable rubber polymer other than the component (A-1) can be used. Since the rubbery polymer as the component (A-1) has large performance improving effects, addition of it makes it possible to produce, even in a small content in the raw material rubber, a vulcanized rubber composition having an improved performance. As the component (A-2), at least one selected from synthetic rubbers and natural rubbers is used as needed. Specific examples of the component (A-2) include butadiene rubber, styrene-butadiene rubber, styrene-isoprene-butadiene rubber and synthetic polyisoprene rubber, which are other than the component (A-1), and butyl rubber and natural rubbers. At least one selected from them is used. Examples of the butadiene rubber as component (A-2), other than the component (A-1), include high-cis butadiene rubber available using any one of cobalt, nickel, neodymium and uranium catalysts, low-cis butadiene rubber available using a lithium catalyst and medium high-vinyl butadiene rubber; those of the styrene-butadiene rubber other than the component (A-1) include emulsion-polymerized styrene-butadiene rubber having a styrene content of 3 to 50 wt. % and solution-polymerized styrene-butadiene rubber having a styrene content of 3 to 50 wt. % and a 1,2-bond content, at the butadiene moiety, of 10 to 80%; those of the styrene-isoprene-butadiene rubber other than the component (A-1) include styrene-isoprene-butadiene rubber having a styrene content of 3 to 40 wt. % and an isoprene content of 3 to 40 wt. %; and those of the synthetic polyisoprene rubber other than the component (A-1) include synthetic polyisoprene rubber having a cis-1,4-bond content of 90% or greater. After optimization of the physical properties and processability of this component according to the using purpose of the rubber composition, it is added. Particularly preferred as the component (A-2) is the solution-polymerized styrene-butadiene rubber, which brings about excellent balance between low rolling resistance and wet skid resistance, thereby satisfying the object of the invention.

In a preferred mode of the invention, use of, as the component (A-1), a specific polymer containing a modified component in an amount of 70 wt. % or greater and having a glass transition point ranging from −80 to −20° C., and, as the component (A-2), a solution-polymerized styrene-butadiene copolymer rubber having a glass transition point ranging from −50 to −20° C. and a Mooney viscosity (ML1+4 (100° C.)) of 100 or greater is desired.

Another preferred example of a solution-polymerized styrene-butadiene copolymer rubber is that having a Mooney viscosity (ML1+4 (100° C.)) ranging from 150 or greater and a molecular weight distribution (Mw/Mn) ranging from 1.4 to 2.2. By using it in combination with the specific rubbery polymer as the component (A-1) of the present invention, a rubber composition having good strength properties and an excellent balance between low rolling resistance and wet skid resistance can be produced.

As the component (A-2), an emulsion-polymerized styrene-butadiene copolymer rubber having a styrene content of 30 to 50 wt. % and a Mooney viscosity (ML1+4 (100° C.)) ranging from 100 or greater is also usable.

In the present invention, another additive such as zinc white, stearic acid, vulcanizing assistant, antioxidant and/or processing aid is added as needed in an amount satisfying the object of the present invention, for example, 0.1 to 20 parts by weight.

In the present invention, a diene polymer rubber vulcanizate is provided by kneading, at least once, the component (A-1), or the components (A-1), (A-2), (B) and (C), and optionally the component (E), the component (F) and another additive in a known enclosed mixer such as internal mixer under the conditions permitting the kneading and discharging temperature of 135 to 180° C., thereby controlling the bound rubber content after mixing (a ratio of the raw material rubber component bonded to the reinforcing filler) to 30 to 70 wt. %; adding a vulcanizing agent and a vulcanizing accelerator as the component (D); and kneading them in a known mixer such as internal mixer or mixing roll to control the kneading and discharging temperature to 120° C. or less, thereby vulcanizing. At the kneading and discharging temperature outside the above-described range, a diene polymer rubber vulcanizate excellent in the balance between low rolling resistance and wet skid resistance and having improved strength properties is not available and therefore the object of the invention cannot be satisfied. The bound rubber content is required to be 30 to 70 wt. %. At a bound rubber content less than 30 wt. %, a diene polymer rubber vulcanizate excellent in the balance between low rolling resistance and wet skid resistance and having improved strength properties is not available and therefore, the object of the present invention cannot be satisfied. Bound rubber contents exceeding 70 wt. %, on the other hand, increase the torque upon kneading, thereby making it difficult to conduct processing. The bound rubber content ranging from 40 to 70 wt. % is preferred.

In the present invention, it is more preferred to carry out vulcanization by adding an organosilane coupling agent, as the component (E), in an amount of 0.1 wt. % or greater but less than 6 wt. % based on the amount of the reinforcing silica, kneading the mixture at least once under the conditions permitting the kneading and discharging temperature of 135 to 180° C., thereby controlling the bound rubber content after mixing (a ratio of the raw material rubber component bonded to the reinforcing filler) to 30 to 70 wt. %, adding a vulcanizing agent and vulcanizing accelerator as the component (D), and kneading the mixture to give the kneading and discharging temperature of 120° C. or less.

Moreover, it is preferred to conduct vulcanization by kneading, depending on the heating loss (Mo) of the reinforcing silica as the component (C), the components at least once under the conditions permitting the following kneading and discharging temperature (Td):

135≦Td≦180° C. when 1%≦Mo≦4%

(15×Mo+75)° C.<Td≦180° C. when 4%<Mo≦6%, and

165° C.<Td≦180° C. when 6%<Mo≦10%, thereby controlling the bound rubber content after kneading (a ratio of the raw material rubber component bonded to the reinforcing filler) to 30 to 70 wt. %, adding a vulcanizing agent and a vulcanizing accelerator as the component (D), and kneading the mixture to give the kneading and discharging temperature of 120° C. or less. The diene polymer rubber vulcanizate available in this manner is excellent in the balance of low rolling resistance and wet skid resistance and improved in strength properties.

The performance of the vulcanized rubber composition available as a final product differs depending on the water content (measured as a heating loss (Mo) at 105° C. after 8 hours) of the reinforcing silica due to the difference in its production process. In the present invention, it is preferred to adjust the kneading temperature of the components, depending on the heating loss of the reinforcing silica. Silicas different in heating loss are available by drying commercially-available silica, whose heating loss is approximately 6 to 8%, at a temperature range of 100 to 120° C. under normal pressure. For example, silica having a heating loss of 1 to 4 wt. % can be obtained by drying commercially-available silica at 105° C. under normal pressure for approximately 1 to 8 hours.

The optimum temperature varies depending on the heating loss of silica, because heating loss of reinforcing silica, that is, water adsorbed to the reinforcing silica becomes an inhibitory factor against the reaction between the reinforcing silica and modified polymer. When silica having a higher heating loss is used, rubber is not bonded to silica sufficiently at the kneading and discharging temperature lower than the lower limit of the range, while scorch of the composition and crosslinking reaction happen at the kneading and discharging temperature higher than the upper limit of the range. The temperature outside the range is therefore not preferred. Such adjustment of the kneading and discharging temperature makes it possible to bring about effects for improving the productivity on the industrial scale.

In the present invention, a diene polymer rubber vulcanizate available by vulcanizing in a conventional manner, for example, at 120 to 200° C., preferably 140 to 180° C. exhibits its performance as it is.

The rubbery polymer according to the invention is suitably used, in the form of a diene polymer rubber vulcanizate, for tire tread mixtures typified by high-performance tires and all-season tires, but it is also applied to another tire, rubber vibration isolator, belt, industrial good, footwear and the like.

The present invention will hereinafter be described in detail by examples and comparative examples. It should however be borne in mind that the present invention is not limited to or by them.

REFERENCE EXAMPLE 1

Manufacturing Process of SBR—1

A thermostatic autoclave having an internal volume of 10 liter and equipped with a stirrer and a jacket was used as a reactor. In the reactor, 645 g of impurity-removed butadiene, 280 g of styrene, 5500 g of cyclohexane and 0.70 g of 2,2-bis(2-oxolanyl)propane as a polar substance were charged and the internal temperature of the reactor was adjusted to 30° C. A cyclohexane solution containing 0.85 g of n-butyl lithium was fed as a polymerization initiator to the reactor. After initiation of the reaction, the internal temperature of the reactor gradually increased by the heat generated upon polymerization. For 5 minutes from 7 minutes to 12 minutes after the addition of the polymerization initiator, 75 g of butadiene was fed at a rate of 15 g/min. The final internal temperature in the reactor reached 75° C. After completion of the polymerization reaction, a portion of the polymer solution was sampled. The Mooney viscosity of the pre-modified polymer as measured after the removal of the solvent at 100° C. was 7. As a modifier, 1.2 g of tetraglycidyl-1,3-bisaminomethylcyclohexane was added to the reactor and modification reaction was conducted while maintaining the temperature at 75° C. for 5 minutes. After addition of an antioxidant to this polymer solution, the solvent was removed, whereby a styrene-butadiene copolymer (Sample A) having a modified component was obtained. The modified polymer had a Mooney viscosity of 65 as measured at 100° C.

Analysis of the sample A resulted in 28% of a bond styrene content and 72% of a bonded butadiene content. It was also found that the 1,2-bond content of the microstructure of the butadiene moiety as measured in accordance with Hampton's method from the measuring results using an infrared spectrophotometer was 52%, and the weight-average molecular weight (Mw), number-average molecular weight (Mn) and molecular weight distribution (Mw/Mn) were 563000, 423000 and 1.33, respectively in terms of polystyrene as measured by GPC; and a modifying ratio as determined from GPC using a silica adsorption column was 83%.

In addition, styrene-butadiene copolymer rubbers were prepared as Samples B to P and Samples BA to BE in a similar manner to Sample A except for a change of the bonded styrene content, 1,2-bond content of a butadiene moiety, Mooney viscosity, glass transition point, molecular weight distribution, modification ratio or modifying agent.

The samples O and P having a high molecular weight were prepared as a product extended with 37.5 parts by weight of an aromatic oil. Among those samples, Samples A, B, C, H, J, K, L, N, N, O, BA, BB, BC and BD are polymers specified as the component (A-1) of the composition of the invention, while Samples D, E, F, G, P and BE are prepared for comparison and are polymers outside the range specified as the component (A-1) of the composition of the invention.

REFERENTIAL EXAMPLE 2

Manufacturing Process of SBR—2

Two autoclaves each having an internal volume of 10 liters, having an inlet at the bottom and an outlet at the top and being equipped with a stirrer and a jacket were connected in series as reactors. After mixing 16.38 g/min of butadiene, 8.82 g/min of styrene and 132.3 g/min of n-hexane, the resulting mixture solution was allowed to pass through a dehydration column filled with active alumina. Impurities were removed by mixing n-butyl lithium at a rate of 0.0046 g/min in a static mixer. The residue was then continuous fed from the bottom of the first reactor through a constant delivery pump. The reactor was fed directly with 2,2-bis(2-oxolanyl)propane at a rate of 0.028 g/min as a polar substance and n-butyl lithium at a rate of 0.070 g/min as a polymerization initiator. The internal temperature of the reactor was maintained at 86° C. From the top portion of the reactor, the polymer solution was continuously taken out and fed to the second reactor. It was found that after the first reactor became stable, the resulting pre-modified polymer had a Mooney viscosity of 55 as measured at 100° C. At the temperature of the second reactor maintained at 80° C., 0.009 g/min (equivalent ratio relative to active lithium=0.9) of tetraglycidyl-1,3-bisaminomethylcyclohexane was added from the bottom of the reactor to effect modification reaction. An antioxidant was continuously added to this polymer solution and modification reaction was terminated. By the removal of the solvent, the target styrene-butadiene copolymer having a modified component was obtained. It was found that this modified polymer had a Mooney viscosity of 163 as measured at 100° C. To 100 parts by weight of this polymer solution, 37.5 parts by weight of an aromatic oil ("X-140", trade name; product of Japan Energy Co., Ltd.) was added to yield an oil-extended oil (Sample Q).

As a result of analysis of the sample Q, the bonded styrene content was 35%; the bonded butadiene content was 65%; the 1,2-bond content of the butadiene moiety as determined in accordance with the Hampton's method by calculating the results measured by an infrared spectrophotometer was 35 mole %; the Mooney viscosity (ML1+4, 100° C.) after oil extension was 65; and the glass transition point was −34° C. According to the molecular weight distribution by GPC (detector: RI) with THF as a solvent, the weight-average molecular weight (Mw), the number-average molecular weight (Mn), and the molecular weight distribution (Mw/Mn) were 656000, 264000 and 24800, respectively, each in terms of polystyrene; and the GPC curve had a monomodal shape. The modification ratio as determined from GPC curve using a silica series adsorption column was found to be 65%.

In a similar manner to the continuous polymerization method employed for preparing Sample Q except for a change of the amount of BuLi, the amount of the modifying agent and the kind of the modifying agent, Samples R to AC different in structure were obtained.

A commercially-available styrene-butadiene rubber, butadiene rubber and natural rubber as shown in Table 4 were also employed as samples.

The analysis values of these samples are shown in Tables 1 to 4. These samples were analyzed in accordance with the method as described below.

1) Bonded Styrene Content

The sample was dissolved in chloroform and the bonded styrene content (S (wt. %)) was measured from the absorption of styrene by a phenyl group at 254 nm.

2) The Microstructure of a Butadiene Moiety

The sample was dissolved in carbon disulfide and the microstructure of the butadiene moiety was determined by measuring the infrared ray spectrum within a range of 600 to 1000 cm-1 by using a solution cell, and calculating from a predetermined absorbance in accordance with the equation of the Hampton's method.

3) Glass Transition Temperature

It was measured at a heating rate of 10° C./min by using DSC. The on set point was designated as Tg.

4) Mooney Viscosity

The viscosity four minutes after preheating at 100° C. for 1 minute was measured in accordance with JIS K 6300.

5) Molecular Weight and Molecular Weight Distribution

The chromatogram was measured by GPC having three connected columns using a polystyrene gel as a filler. The molecular weight and molecular weight distribution were calculated from the calibration curve based on standard polystyrene.

6) Modification Ratio

By making use of the properties of the modified component to adsorb to a GPC column using silica gel as a filler, both chromatogram's of GPC of polystyrene gel ("Shodex" of Showa Denko K.K.) and GPC of silica column ("Zorbax" of Dupont) were measured with regards to the test solution containing a sample and a low-molecular-weight internal standard polystyrene. The adsorption amount to the silica column was measured from their difference and modification ratio was determined.

EXAMPLES

Rubber mixtures were obtained using Samples shown in Tables 1 to 4 as raw material rubbers and kneading the blending formulations as shown in Table 5 by the below-described mixing method.

Kneading Method

In an enclosed kneader (internal volume: 1.7 liter) equipped with a thermostat using water circulated from the outside, a raw material rubber, filler (silica and carbon black), organosilane coupling agent, aromatic oil, zinc white and stearic acid were kneaded (the kneading procedure will be shown in Table 6) as the first-stage kneading under the conditions of a filling rate of 65% and rotational number of the rotor of 66/77 rpm. Upon kneading, the temperature of the enclosed mixer was adjusted and rubber compositions different in discharge temperature were obtained.

After cooling of the mixture thus obtained to room temperature, an antioxidant was added thereto and then, kneading was conducted again as the second-stage kneading to improve dispersion of silica. In this case, the discharge temperature was adjusted by the temperature of the mixer.

After cooling, sulfur and a vulcanizing accelerator were kneaded as the third-stage kneading in an open roll set at 70° C.

The resulting kneaded mass was molded and vulcanized under a vulcanizing press at 160° C. for a predetermined time. The below-described physical properties were measured as the performances of a tire.

1) Bound Rubber Content

The composition (0.2 g) sampled after completion of the second-stage kneading was cut into square pieces of about 1 mm and placed in a Harris's basket (made of a 100-mesh metal mesh). These pieces were weighed. After immersion in toluene for 24 hours, they were weighed again. From the amount of the component not dissolved in toluene, the amount of the rubber bound to the filler was calculated and designated as the bound rubber content.

2) Mooney Viscosity of the Mixture

Viscosity four minutes after preheating for 1 minute at 130° C. and 2 revolutions was measured in accordance with JIS K 6300 by a Mooney viscometer. The mixture having a Mooney viscosity largely exceeding 80 is inferior in processability. When the Mooney viscosity is not greater than 30, large adhesion prevents smooth processing.

3) 300% Modulus and Tensile Strength

Measured in accordance with the tensile test method of JIS K 6251.

4) Fuel-cost Saving Performance

Tested in Tan δ at 50° C. Measured by ARES viscoelasticity tester of Rheometric Scientific at a Frequency of 10 Hz, distortion of 3% and 50° C. in accordance with a torsion system. The smaller the numeral, the better the fuel-cost-saving performance.

5) Wet Skid Resistance

Tested in Tan δ at 50° C. Measured by ARES viscoelasticity tester of Rheometric Scientific at a frequency of 10 Hz, distortion of 3% and 50° C. in accordance with a torsion system. The greater the numeral, the better the wet skid resistance.

Examples 1-1 to 1-3 and Comparative Examples 1-1 to 1-4

Vulcanized rubber compositions were prepare using, as a raw material rubber, Samples A, B and C having a modified component as specified by the invention, Sample D which has the modified component as specified by the invention but in an amount outside the range of the invention, Samples E and F having a modified component other than that specified by the invention, and unmodified Sample G, each in accordance with the silica-containing formulation (Formulation S-1) as specified by the invention. Their performances were evaluated. As the silica, that having a water adsorption amount Mo (heating loss content: drying under normal pressure at 105° C. for 8 hours) of 5.4% was employed. The measurement results are shown in Table 7.

As is apparent from Table 7, the vulcanized rubber compositions of Examples 1-1 to 1-3 using the rubbery polymer within the range as specified by the invention are superior in fuel-cost-saving performance and wet skid resistance to the compositions of Comparative Examples 1-1 to 1-4 in the same silica-containing formulation.

Examples 2-1 and Comparative Examples 2-1 to 2-4

Vulcanized rubber compositions were prepared, in different formulations as shown in Table 8, by using Sample A which was a specific styrene-butadiene rubber of the invention, Sample D for which a modifying agent as specified by the invention was used at a modifying amount outside the range of the invention, Sample RB which was a commercially-available emulsion-polymerized SBR and Sample RC which was a commercially-available solution-polymerized SBR. The performances of them were measured and their results are shown in Table 8. As the silica, that having a water adsorption amount Mo of 5.4% was used.

As is apparent from the results of Table 8, the silica-containing composition according to the invention exhibited good fuel-cost-saving performance compared with the composition of Comparative Example 2-1 in which carbon black was incorporated (Composition S-11). The composition of Example 2-1 was markedly superior in fuel-cost-saving performance to the carbon-black-containing composition of Comparative Example 2-3 using emulsion polymerized SBR (RB); and was improved much in wet skid resistance and also in fuel-cost-saving performance compared with the carbon-black-containing composition of Comparative Example 2-4 using Sample RC, that is, the commercially-available solution-polymerized SBR.

Examples 3-1 to 3-4

Vulcanized rubber compositions were prepared in a similar manner to Example 1 by using Samples H, J and K which had a styrene-butadiene rubber structure within the range specified by the invention. As the silica, that having a water adsorption amount Mo of 5.4% was employed. The evaluation results of the performances of these compositions are shown in Table 9.

As is apparent from the results of Table 9, the vulcanized rubber compositions of Examples 3-1 to 3-4 using the samples within the range of the invention showed good processability, tensile strength, and balance between fuel-cost-saving performance and wet skid resistance.

Examples 4-1 to 4-2 and Comparative Examples 4-1,to 4-2

Vulcanized rubber compositions rich in a filler were obtained in a similar manner to Example 1 by using Samples O and Q which had a styrene-butadiene rubber structure within the range specified by the invention. As the silica, that having a water adsorption amount Mo of 5.4% was employed. For comparison, a vulcanized rubber composition was prepared using solution-polymerized styrene-butadiene Sample P which was outside the range of the invention. Evaluation results of the performances of these compositions are shown in Table 10.

As is apparent for the results of Table 10, the vulcanized rubber composition of Examples 4-1 and 4-2 using the samples which were within the range of the invention exhibit good processability and good balance between fuel-cost-saving performance and wet skid resistance. The composition using Sample P which was outside the range of the invention has a high viscosity and is therefore inferior in processability.

Examples 5-1 to 5-3 and Comparative Examples 5-1 to 5-2

Vulcanized rubber compositions were prepared in accordance with Blending formulation S-2 as shown in Table 5 by using Sample A which was a specific styrene-butadiene rubber of the invention and Sample RF which was a commercially-available styrene-butadiene rubber obtained by solution polymerization. As the silica, that having a water adsorption amount Mo of 5.4% was employed. Evaluation results of their performances are shown in Table 11.

As is shown in Table 11, the samples within the range of the intention exhibit good fuel-cost-saving performance, but those outside the range of the invention bring about small effects.

Examples 6-1 to 6-16 and Comparative Examples 6-1 to 6-6

Vulcanized rubber compositions as shown in Table 12 were prepared using Samples A, H, O and L which were styrene-butadiene rubbers within the range of the present invention, a butadiene rubber (Sample RD), emulsion-polymerized styrene-butadiene rubbers (Samples RA and RB) and Samples D, P, R and S which were solution-polymerized SBRs outside the range specified as Component (A-1) of the present invention. As the silica, that having a water adsorption amount Mo of 5.4% was employed. Evaluation results of their performances are shown in Table 12.

Even if rubber compositions obtained using the sample within the range of the invention are blended with a styrene-butadiene rubber or butadiene rubber, the mixtures exhibit good fuel-cost saving performance and wet skid resistance while maintaining processability, compared with the vulcanized rubber compositions of Comparative Examples which are outside the range of the invention.

Examples 7-1 to 7-2 and Comparative Example 7-1

In Examples 7-1 and 7-2, blend compositions as shown in Table 13 were prepared by using Samples N and M, that is, styrene-butadiene rubbers within the range specified by the invention and a natural rubber. Their performances were compared pith the composition of Comparative Example 7-1 composed solely of a natural rubber. As the silica, that having a water adsorption amount Mo of 5.4% was employed.

As shown in Table 13, the fuel-cost saving performance of the natural rubber was improved by the addition of the polymer of the present invention.

Examples 8-1 and Comparative Examples 8-1 to 8-4

In accordance with the silica-containing formulation (Formulation S-2) as specified by the invention or ordinarily-employed carbon-black formulation (Formulation R-12), vulcanized rubber compositions were prepared using, as the raw material rubber, Sample Q having a modified component as specified by the invention, Sample T using a modifying agent outside the range of the invention, Sample X using a modifying agent as specified by the invention but having a modified component outside the range of the invention, and Sample RH which was a standard emulsion-polymerized styrene-butadiene rubber; and their performances were evaluated. As the silica, that having a water adsorption amount Mo of 5.4% was employed. Results are shown in Table 14.

As is apparent from Table 14, the composition or Example 8-1 is superior in fuel-cost-saving performance and wet skid resistance to Comparative Example 8-2 (Sample T) and Comparative Example 8-3 (Sample X), each in accordance with the silica-containing formulation. It is markedly superior in fuel-cost-saving performance to the carbon-black formulation (Comparative Example 8-1) and also exhibits excellent fuel-cost-saving performance and wet skid resistance compared with the vulcanized rubber composition of Comparative Example 8-4 using emulsion-polymerized SBR.

Examples 9-1 to 9-3 and Comparative Examples 9-1 to 9-2

Vulcanized rubber compositions were prepared using Sample A, the styrene-butadiene rubber as specified in the invention, in accordance with the blending formulations different in the silica amount or carbon black amount as shown in Table 5. Measurement results of their performances are shown in Table 15. As the silica, that having a water adsorption amount Mo of 5.4% was employed.

As is apparent from the results of Table 15, the composition using Sample A while keeping the content of silica within the range of the invention exhibits excellent fuel-cost-saving performance compared with the comparative composition rich in carbon black.

Examples 10-1 to 10-2 and Comparative Examples 10-1

Vulcanized rubber compositions were prepared using Samples U, V and Z which had a styrene-butadiene rubber structure within the range of the invention in accordance with Blending Formulation S-2 as shown in Table 5. For comparison, a vulcanized rubber composition was prepared using Sample W which was a styrene-butadiene rubber outside the range of the invention. As the silica, that having a water adsorption amount of 5.4% was employed. Evaluation results of their performances are shown in Table 16.

As is apparent from the results of Table 16, the vulcanized rubber compositions using the samples within the range of the invention exhibit superior tensile strength, fuel-cost-saving performance and wet skid resistance, while the vulcanized rubber composition outside the range of the invention is inferior in fuel-cost-saving performance.

Examples 11-1 to 11-5 and Comparative Example 11-1

Vulcanized rubber compositions as shown in Table 17 were prepared using Samples U and V which were styrene-butadiene rubbers within the range of the invention, a butadiene rubber (Sample RD), an emulsion-polymerized styrene-butadiene rubber (Sample RA) and natural rubber (Sample RE). As the silica, that having a water adsorption amount of 5.4% was employed. Evaluation results of their performances are shown in Table 17.

The composition using Sample U or Sample V which was within the range of the invention exhibited superior balance between fuel-cost-saving performance and wet skid resistance to the emulsion-polymerized styrene-butadiene rubber composition (Comparative Example 11-1) even if used as a mixture with a styrene-butadiene rubber.

Examples 12-1 to 12-6 and Comparative Examples 12-1 to 12-3

Vulcanized rubber compositions as shown in Table 18 were prepared using Sample Q which was a styrene-butadiene rubber within the range specified by the invention, commercially available emulsion-polymerized styrene-butadiene rubbers (Samples RA and RH), and commercially available solution polymerized styrene-butadiene rubbers (Samples RC, RF and RG). As the silica, that having a water adsorption amount of 5.4% was employed. Evaluation results of their performances are shown in Table 18. Even if blended with such a rubber, the compositions (Examples 12-1 to 12-6) using Sample Q which was within the range of the invention exhibit superior fuel-cost-saving performance and wet skid resistance to the compositions (Comparative Examples 12-1 to 12-3) outside the range of the invention.

Examples 13-1 to 13-8

Compositions of Examples 13-1 to 13-8 which were within the range specified by the invention were prepared using Sample J which was within the range of the present invention as the raw material rubber, using silicas different in heating loss as shown in Table 19, preparing silica-containing compositions by adjusting the first-stage discharging temperature and the second-stage discharging temperature as shown in Table 19, adding a vulcanizing agent and the like at the third-stage temperature of 70° C., forming the mixture into a predetermined sample shape and press vulcanizing it at 160° C. for 30 minutes. The evaluation results of their performances are shown in Table 19.

As is apparent from Table 19, the vulcanized rubber compositions of Examples 13-1 to 13-7 prepared under conditions within the range of the present invention each has a large bound rubber content and exhibits good fuel-cost-saving performance while maintaining high wet skid resistance.

Examples 14-1 to 14-6 and Comparative Examples 14-1 to 14-3

Compositions of Examples 14-1 to 14-5 within the range specified by the invention and Compositions of Comparative Examples 14-1 to 14-3 outside the range of the invention were prepared using, as a raw material rubber, Samples J and Q which were within the range of the invention, changing the amount of an organosilane coupling agent as shown in Tables 5 and 20, preparing silica-containing compositions by adjusting the first-stage discharging temperature and second-stage discharging temperature as shown in Table 20, adding a vulcanizing agent and the like at the third-stage temperature of 70° C., molding the resulting mixture into a predetermined sample shape and press vulcanizing it at 160° C. for 30 minutes. As the silica, that having a water adsorption amount Mo of 5.4% was employed. Evaluation results of their performances are shown in Table 20.

As is apparent from Table 20, vulcanized rubber compositions obtained in Examples 14-1 to 14-6 by using the raw material rubber as specified by the invention and adding an organosilane coupling agent in an amount as specified by the invention have a high bound rubber content, and exhibit good polymer/silica dispersion, good processability and good fuel-cost-saving performance while maintaining high wet skid resistance. The compositions obtained in Comparative Examples 14-1 to 14-3 by using Sample F which was outside the range of the invention each has a small bound rubber content, and even a vulcanized composition is inferior in reinforcing effects because its 300% modulus is low, and is moreover, inferior in both the fuel-cost-saving performance and wet skid resistance.

Examples 15-1 to 15-6 and Comparative Examples 15-1 to 15-2

Compositions of Examples 15-1 to 15-6 within the range of the present invention and those of Comparative Examples 15-1 to 15-2 outside the range of the present invention were prepared by using, as a raw material rubber, Samples BA, BB and BC which had been modified by tetraglycidyl-1,3-bisaminomethylcyclohexane added in an amount exceeding 1 equivalent per active lithium, Sample BD modified by a modifier used in an amount not greater than 1 equivalent per active lithium, and Sample BE for which silicon tetrachloride had been used as a coupling agent according to the blending formulation as shown in Table 5, adjusting the first-stage discharging temperature and second-stage discharging temperature as shown in Table 21, thereby preparing a silica-containing composition, adding a vulcanizing agent and the like at the third-stage temperature of 70° C., molding or forming the resulting mixture into a predetermined shape and press vulcanizing it at 160° C. for 30 minutes. As the silica, that having a water adsorption amount Me of 6.5% was employed. Evaluation results of their performances are shown in Table 21.

As is apparent from Table 21, vulcanized rubber compositions prepared in Examples 15-1 to 15-6 by adding a modifying agent in an amount within a specified range of the invention exhibit good fuel-cost-saving performance while showing high wet skid resistance. The compositions obtained in Comparative Examples 15-1 to 15-2 by using the samples outside the range of the present invention but according to the same blending formulation are, on the other hand, inferior in both fuel-cost saving performance and wet skid resistance.

Examples 16-1 to 16-6 and Comparative Examples 16-1 to 16-3

Rubber compositions were prepared by using, as a raw material rubber, Samples AA to AC and BA, which had been extended by an aromatic oil and to which tetraglycidyl-1,3-bisaminomethylcyclohexane had been added as a modifier in an amount exceeding 1 equivalent per active lithium and Samples T and Y to be used for comparison, adjusting the first-stage discharging temperature and second-stage-discharging temperature as shown in Table 22, thereby preparing silica-containing compositions, adding a vulcanizing agent and the like at the third-stage temperature of 70° C., molding or forming the mixtures into a predetermined shape and then press vulcanizing them at 160° C. for 30 minutes. As the silica, that having a water adsorption amount Mo of 6.5% was employed. Measurement results of their performances are shown in Table 22.

As is apparent from results of Table 22, the compositions of Examples 16-1 to 16-1 prepared using Samples AB, AB, AC and BA to which a modifying agent had been added in an amount within the range of the invention exhibits good fuel-cost-saving performance, while maintaining high skid resistance. The composition using Sample T to which a modifying agent outside the range of the invention had been added and that using unmodified Sample Y are, on the other hand, inferior in fuel-cost-saving performance.

Examples 17-1 to 17-5

Rubber compositions were obtained by using, as a raw material rubber, Samples A, AA, BA and Q shown in Table 23, each within the range of the present invention, adjusting the first-stage discharging temperature and second-stage discharging temperature as shown in Table 23, thereby preparing silica-containing compositions, adding a vulcanizing agent and the like at the third-stage temperature of 80° C., molding or forming the mixtures into a predetermined shape and press vulcanizing them at 160° C. for 30 minutes. As the silica, that having a water adsorption amount Mo of 5.4% was employed. Measurement results of their performances are shown in Table 23.

As is apparent from the results of Table 23, the compositions of Examples 17-1 to 17-5 each obtained by mixing the sample within the range of the invention exhibit good fuel-cost-saving performance, while maintaining high wet skid performance.

TABLE 1

| Sample | Bonded styrene content (wt. %) | Butadiene 1,2-bond content (% in BD) | Tg (° C.) | Modifier | Amount of modifier (equivalent/active lithium) | Modification ratio (%) | Mw ($10^4$) | Mw/Mn | Mooney viscosity (ML1 + 4, 100° C.) | Remarks |
|---|---|---|---|---|---|---|---|---|---|---|
| A | 28 | 52 | −32 | TGAMH *1 | 0.99 | 83 | 56.3 | 1.33 | 65 | |
| B | 28 | 52 | −32 | EPPD *2 | 0.90 | 80 | 50.5 | 1.85 | 63 | |
| C | 28 | 52 | −32 | TGAMH | 0.75 | 65 | 49.4 | 1.25 | 65 | |
| D | 28 | 52 | −32 | TGAMH | 0.60 | 50 | 46.2 | 1.45 | 62 | |
| E | 28 | 52 | −32 | SnCl$_4$ *3 | 0 | 0 | 51.5 | 1.47 | 65 | SnCl4/Li = 0.9 |
| F | 28 | 52 | −32 | SiCl$_4$ *4 | 0 | 0 | 50.4 | 1.65 | 65 | SiCl4/Li = 0.9 |
| G | 28 | 52 | −32 | Not added | 0 | 0 | 45.8 | 1.18 | 65 | |
| H | 20 | 64 | −34 | TGAMH | 0.95 | 81 | 54.8 | 1.38 | 67 | |
| J | 35 | 40 | −32 | TGAMH | 0.95 | 75 | 51.3 | 1.44 | 65 | |
| K | 28 | 39 | −40 | TGAMH | 0.95 | 78 | 46.7 | 1.46 | 56 | |
| L | 15 | 45 | −55 | TGAMH | 0.95 | 78 | 50.8 | 1.42 | 67 | |
| M | 10 | 39 | −65 | TGAMH | 0.95 | 80 | 52.3 | 1.37 | 62 | |
| N | 0 | 18 | −92 | TGAMH | 0.95 | 70 | 49.8 | 1.40 | 55 | |

*1:TGAMH: tetraglycidyl-1,3-bisaminomethylcyclohexane
*2:EPPD: epoxydated liquid polybutadiene
*3:SnCl$_4$: tin tetrachloride
*4:SiCl$_4$: silicon tetrachloride

TABLE 2

| Sample | Bonded styrene content (wt. %) | Butadiene 1,2-bond content (% in BD) | Tg (° C.) | Modifier | Amount of modifier (equivalent/active lithium) | Modification ratio (%) | Mw ($10^4$) | Mw/Mn | Oil extension amount (parts by weight) | Oil-extended Mooney viscosity (ML1 + 4, 100° C.) | Remarks |
|---|---|---|---|---|---|---|---|---|---|---|---|
| O | 29 | 50 | −33 | TGAMH | 0.90 | 72 | 66.5 | 1.77 | 37.5 | 63 | |
| P | 35 | 36 | −33 | SiCl$_4$ | 0 | 0 | 75.2 | 1.65 | 37.5 | 85 | SiCl$_4$/Li = 0.9 |
| Q | 35 | 35 | −34 | TGAMH | 0.90 | 65 | 65.6 | 2.48 | 37.5 | 65 | |
| R | 28 | 52 | −31 | TGAMH | 0.85 | 59 | 65.2 | 2.44 | 37.5 | 62 | |
| S | 26 | 63 | −26 | TGAMH | 0.50 | 40 | 61.3 | 2.33 | 37.5 | 58 | |
| T | 35 | 35 | −34 | SiCl$_4$ | 0 | 0 | 65.2 | 2.55 | 37.5 | 66 | SiCl$_4$/Li = 0.9 |
| U | 42 | 36 | −24 | TGAMH | 0.90 | 70 | 63.8 | 2.33 | 37.5 | 60 | |
| V | 25 | 65 | −27 | TGAMH | 0.95 | 65 | 61.0 | 2.42 | 37.5 | 55 | |
| W | 42 | 36 | −24 | TGAMH | 0.70 | 40 | 62.2 | 2.56 | 37.5 | 67 | Impurity-rich butadiene was used |
| X | 35 | 35 | −34 | TGAMH | 0.50 | 35 | 67.1 | 2.90 | 37.5 | 64 | Impurity-rich butadiene was used |
| Y | 35 | 35 | −34 | Not added | 0 | 0 | 63.0 | 2.33 | 37.5 | 62 | |
| Z | 33 | 53 | −22 | TGAMH | 0.90 | 65 | 74.7 | 2.23 | 37.5 | 75 | |
| AA | 35 | 33 | −36 | TGAMH | 4.0 | 75 | 71.3 | 1.95 | 37.5 | 70 | |
| AB | 35 | 33 | −36 | TGAMH | 1.8 | 78 | 67.1 | 2.30 | 37.5 | 64 | |
| AC | 25 | 65 | −25 | TGAMH | 3.0 | 80 | 68.3 | 2.03 | 37.5 | 67 | |

TABLE 3

| Sample | Bonded styrene content (wt. %) | Butadiene 1,2-bond content (% in BD) | Tg (° C.) | Modifier | Amount of modifier (equivalent/active lithium) | Modification ratio (%) | Mw ($10^4$) | Mw/Mn | Mooney viscosity (ML1 + 4, 100° C.) | Remarks |
|---|---|---|---|---|---|---|---|---|---|---|
| BA | 35 | 40 | −32 | TGAMH | 2.0 | 83 | 44.6 | 1.55 | 69 | |
| BB | 35 | 40 | −32 | TGAMH | 4.0 | 85 | 42.1 | 1.61 | 61 | |
| BC | 35 | 40 | −32 | TGAMH | 2.0 | 83 | 43.8 | 1.83 | 65 | |
| BD | 35 | 40 | −32 | TGAMH | 0.95 | 75 | 52.3 | 1.44 | 65 | |
| BE | 35 | 40 | −32 | SiCl$_4$ | 0 | 0 | 53.3 | 1.47 | 68 | SiCl$_4$/Li = 1.2 |

TABLE 4

| Sample | Sample name | Bonded styrene content (wt. %) | Butadiene 1,2-bond content (% in BD) | Glass transition point Tg (° C.) | Non-oil-extended Mooney Viscosity (ML1 + 4, 100° C.) | Oil extension amount (parts by weight) | Oil-extended Mooney viscosity (ML1 + 4, 100° C.) | Remarks |
|---|---|---|---|---|---|---|---|---|
| RA | SBR1721 (emulsion-polymerization product) | 40 | 17 | −36 | — | 37.5 | 55 | Commercially available product |
| RB | SBR1500 (emulsion-polymerization product) | 23.5 | 17 | −57 | 52 | | | Commercially available product |
| RC | Asaprene 1204 (solution-polymerization product) | 25 | 32 | −56 | 56 | — | — | Product of Asahi Kasei |
| RD | High cis BR | 0 | 2 | −108 | 40 | — | — | Commercially available |
| RE | Natural rubber RSS#1 | 0 | — | −68 | — | — | — | Commercially available product |
| RF | Tafden 3335 (solution-polymerization product) | 35.5 | 33 | −34 | — | 37.5 | 55 | Product of Asahi Kasei |
| RG | Tafden 2530 (solution-polymerization product) | 25 | 13 | −70 | — | 37.5 | 40 | Product of Asahi Kasei |
| RH | SBR1712 (emulsion polymer) | 23.5 | 17 | −57 | — | 37.5 | 52 | Commercially available product |

TABLE 5

| Blending formulation | S-1 | S-2 | S-3 | S-4 | S-5 | S-6 | S-7 | S-11 | S-12 | S-13 |
|---|---|---|---|---|---|---|---|---|---|---|
| Rubbery polymer, total amount | 100 | 100 | 100 | 100 | 100 | 100 | 100 | 100 | 100 | 100 |
| Aromatic oil *1 | 20 | 37.5 | 37.5 | 37.5 | 37.5 | 37.5 | 37.5 | 20 | 37.5 | 37.5 |
| Silica *2 | 50 | 50 | 65 | 40 | 65 | 65 | 65 | 0 | 0 | 20 |
| Carbon black N339 *3 | 5 | 20 | 5 | 30 | 5 | 5 | 5 | 60 | 70 | 50 |
| Silane coupling agent *4 | 5 | 5 | 6 | 4 | 3 | 1 | 0 | 0 | 0 | 2 |
| Zinc white | 2.5 | 2.5 | 2.5 | 2.5 | 2.5 | 2.5 | 2.5 | 5 | 5 | 2.5 |
| Stearic acid | 1 | 1 | 1 | 1 | 1 | 1 | 1 | 2 | 2 | 1 |
| Antioxidant 3c *5 | 2 | 2 | 2 | 2 | 2 | 2 | 2 | 1 | 2 | 2 |
| Wax | 1.5 | 1.5 | 1.5 | 1.5 | 1.5 | 1.5 | 1.5 | 1.5 | 1 | 1.5 |
| Sulfur | 1.4 | 1.4 | 1.4 | 1.4 | 2.0 | 2.5 | 2.7 | 1.6 | 2.2 | 1.7 |
| Vulcanizing accelerator CZ *6 | 1.7 | 1.7 | 1.7 | 1.7 | 1.7 | 1.7 | 1.7 | 1.2 | 1.6 | 1.7 |
| Vulcanizing accelerator D *7 | 2 | 2 | 2 | 2 | 2 | 2 | 2 | 0 | 0 | 0 |
| Total | 192.1 | 224.6 | 225.6 | 223.6 | 223.2 | 221.7 | 220.9 | 192.3 | 221.3 | 219.9 |

(Numerals of the unit in the above Table are all parts by weight)
*1: "Sonic X-140", trade name; product of Japan Energy Co., Ltd.
*2: "ULTRASIL VN3", trade name; product of Degussa
*3: "Seast KH", trade name; product of Tokai Carbon Co., Ltd.
*4: "Silane coupling agent Si 69", trade name of Degussa, name of substance: bis-[3-(triethoxysilyl)-propyl]-tetrasulfide
*5: Name of substance: N-isopropyl-N'-phenyl-p-phenylenediamine
*6: Name of substance: N-cyclohexyl-2-benzothiazyl sulpheneamide
*7: Name of substance: diphenylguanidine

TABLE 6

| Time elapsed | Operation |
|---|---|
| | First-stage kneading (B type enclosed mixer, temperature is set upon each kneading) |
| 0 minute | Charging of rubber |
| 0 minute and 30 seconds | Charging of zinc oxide and stearic acid |
| 1 minute | Charging of silica, carbon black and silane coupling agent |
| 3 minutes and 30 seconds | Cleaning after ram is raised |
| 4 minutes | Discharging |
| After discharging | Discharging in portions and cooling by a 10-inch roll after measurement of the temperature of the mixture |

TABLE 6-continued

| Time elapsed | Operation |
| --- | --- |
| Second-stage kneading (B type enclosed mixer, temperature is set upon each kneading) | |
| 0 minute | Charging of the first-stage kneaded mass and antioxidant |
| 2 minutes | Discharging |
| After discharging | Discharging in portions and cooling by a 10-inch roll after measurement of the temperature of the mixture |

TABLE 6-continued

| Time elapsed | Operation |
| --- | --- |
| Third-stage kneading (10-inch mixing roll, set at 70° C.) | |
| 0 minute | Charging of the second-stage kneaded mass |
| 0 minute 15 seconds | Charging of sulfur and vulcanizing accelerator |
| 3 minutes | After discharging, molding or forming |

TABLE 7

| | | | | | | | Vulcanization physical properties | | |
| --- | --- | --- | --- | --- | --- | --- | --- | --- | --- |
| No. | Sample | Modification ratio | Blending formulation | 1st stage/2nd stage kneading and discharging temperature [° C.]/[° C.] | Bound rubber content [wt. %] | Processability Viscosity of mixture (130° C.) | Tensile strength (MPa) | Fuel-cost-saving performance (Tan δ, 50° C.) | Wet skid resistance (Tan δ, 0° C.) |
| Example 1-1 | A | 83 | S-1 | 159/158 | 52 | 62 | 17.5 | 0.147 | 0.802 |
| Example 1-2 | B | 80 | S-1 | 162/162 | 46 | 62 | 16.7 | 0.170 | 0.765 |
| Example 1-3 | C | 65 | S-1 | 160/160 | 50 | 64 | 16.7 | 0.158 | 0.831 |
| Comp. Ex. 1-1 | D | 50 | S-1 | 162/160 | 36 | 58 | 17.4 | 0.200 | 0.746 |
| Comp. Ex. 1-2 | E | 0 | S-1 | 161/162 | 33 | 41 | 14.5 | 0.214 | 0.738 |
| Comp. Ex. 1-3 | F | 0 | S-1 | 160/160 | 32 | 60 | 15.1 | 0.210 | 0.745 |
| Comp. Ex. 1-4 | G | 0 | S-1 | 159/158 | 26 | 63 | 14.8 | 0.210 | 0.757 |

TABLE 8

| | | | | | | | Vulcanization physical properties | | |
| --- | --- | --- | --- | --- | --- | --- | --- | --- | --- |
| No. | Sample | Blending formulation | Silica/Carbon amounts [parts by weight] | 1st stage/2nd stage kneading and discharging temperature [° C.]/[° C.] | Bound rubber content [wt. %] | Processability Viscosity of mixture (130° C.) | Tensile strength (MPa) | Fuel-cost-saving performance (Tan δ, 50° C.) | Wet skid resistance (Tan δ, 0° C.) |
| Example 2-1 | A | S-1 | 50/5 | 159/158 | 52 | 62 | 17.5 | 0.147 | 0.802 |
| Comp. Ex. 2-1 | A | S-11 | 0/60 | 164/164 | 32 | 53 | 17.8 | 0.202 | 0.790 |
| Comp. Ex. 2-2 | D | S-1 | 50/5 | 162/160 | 38 | 63 | 17.4 | 0.200 | 0.746 |
| Comp. Ex. 2-3 | RB | S-11 | 0/60 | 160/161 | 28 | 42 | 23.3 | 0.233 | 0.294 |
| Comp. Ex. 2-4 | RC | S-11 | 0/60 | 162/162 | 29 | 40 | 23.3 | 0.170 | 0.250 |

TABLE 9

| | | | | | | Physical properties upon vulcanization | | |
| --- | --- | --- | --- | --- | --- | --- | --- | --- |
| No. | Sample | Blending formulation | 1st stage/2nd stage kneading and discharging temperature [° C.]/[° C.] | Bound rubber content [wt. %] | Processability Viscosity of mixture (130° C.) | Tensile strength (MPa) | Fuel-cost-saving performance (Tan δ, 50° C.) | Wet skid resistance (Tan δ, 0° C.) |
| Example 3-1 | A | S-1 | 159/158 | 52 | 62 | 17.5 | 0.147 | 0.802 |
| Example 3-2 | H | S-1 | 162/159 | 52 | 65 | 14.8 | 0.155 | 0.747 |
| Example 3-3 | J | S-1 | 160/162 | 48 | 67 | 18.2 | 0.153 | 0.794 |
| Example 3-4 | K | S-1 | 159/158 | 55 | 62 | 17.6 | 0.138 | 0.553 |

TABLE 10

| No. | Sample | Modification ratio (%) | Blending formulation | 1st stage/2nd stage mixing and discharging temperature [° C.]/[° C.] | Bound rubber content [wt. %] | Processability Viscosity of mixture (130° C.) | Vulcanization physical properties | | |
|---|---|---|---|---|---|---|---|---|---|
| | | | | | | | Tensile strength (MPa) | Fuel-cost-saving performance (Tan δ, 50° C.) | Wet skid resistance (Tan δ, 0° C.) |
| Example 4-1 | O | 72 | S-2 | 162/163 | 58 | 74 | 20.9 | 0.148 | 0.815 |
| Example 4-2 | Q | 65 | S-2 | 161/159 | 50 | 68 | 21.3 | 0.185 | 0.780 |
| Comp. Ex. 4-1 | P | 0 | S-2 | 162/160 | 53 | 97 | 21.1 | 0.188 | 0.775 |

TABLE 11

| No. | Component A-1 | | Component A-2 | | Blending formulation | 1st stage/2nd stage mixing and discharging temperature [° C.]/[° C.] | Bound rubber content [wt. %] | Processability Viscosity of blend (130° C.) | Vulcanization physical properties | | |
|---|---|---|---|---|---|---|---|---|---|---|---|
| | Sample | Ratio (wt. %) | Sample | Ratio (wt. %) | | | | | Tensile strength (MPa) | Fuel-cost-saving performance (Tan δ, 50° C.) | Wet skid resistance (Tan δ, 0° C.) |
| Example 5-1 | A | 100 | — | — | S-2 | 158/158 | 53 | 48 | 16.4 | 0.153 | 0.843 |
| Example 5-2 | A | 70 | RF | 30 | S-2 | 159/160 | 51 | 55 | 18.4 | 0.163 | 0.820 |
| Example 5-3 | A | 20 | RF | 80 | S-2 | 161/158 | 48 | 65 | 20.5 | 0.180 | 0.795 |
| Comp. Ex. 5-1 | A | 10 | RF | 90 | S-2 | 159/159 | 43 | 70 | 21.1 | 0.205 | 0.770 |
| Comp. Ex. 5-2 | — | — | RF | 100 | S-2 | 160/160 | 40 | 71 | 21.3 | 0.215 | 0.760 |

When The components (A-1) and (A-2) are oil-extended products, only the rubber content not including the amount of the extension oil is indicated by wt. %.

TABLE 12

| No. | Component A-1 | | Component A-2 (1) | | Component A-2 (2) | | Blending formulation | 1st stage/2nd stage mixing and discharging temperature [° C.]/[° C.] | Processability Viscosity of blend (130° C.) | Vulcanization physical properties | | |
|---|---|---|---|---|---|---|---|---|---|---|---|---|
| | Sample | Ratio (wt. %) | Sample | Ratio (wt. %) | Sample | Ratio (wt. %) | | | | Tensile strength (MPa) | Fuel-cost-saving performance (Tan δ, 50° C.) | Wet skid resistance (Tan δ, 0° C.) |
| Ex. 6-1 | A | 100 | — | — | — | — | S-2 | Approx. 160/approx. 160 | 48 | 16.4 | 0.153 | 0.843 |
| Ex. 6-2 | A | 70 | RB | 30 | — | — | S-2 | Approx. 160/approx. 160 | 44 | 21.1 | 0.175 | 0.624 |
| Com. Ex. 6-1 | D | 70 | RB | 30 | — | — | S-2 | Approx. 160/approx. 160 | 42 | 19.3 | 0.203 | 0.602 |
| Ex. 6-3 | A | 55 | P | 45 | — | — | S-2 | Approx. 160/approx. 160 | 67 | 20.3 | 0.172 | 0.811 |
| Ex. 6-4 | A | 55 | R | 45 | — | — | S-2 | Approx. 160/approx. 160 | 62 | 19.9 | 0.168 | 0.833 |
| Ex. 6-5 | A | 25 | P | 75 | — | — | S-2 | Approx. 160/approx. 160 | 76 | 19.2 | 0.179 | 0.807 |
| Ex. 6-6 | A | 20 | R | 80 | — | — | S-2 | Approx. 160/approx. 160 | 64 | 19.9 | 0.177 | 0.812 |
| Com. Ex. 6-2 | H | 10 | S | 90 | — | — | S-2 | Approx. 160/approx. 160 | 68 | 16.4 | 0.209 | 0.855 |
| Ex. 6-7 | A | 50 | R | 30 | RD | 20 | S-2 | Approx. 160/approx. 160 | 58 | 17.8 | 0,172 | 0.555 |
| Ex. 6-8 | A | 50 | S | 30 | RD | 20 | S-2 | Approx. 160/approx. 160 | 57 | 16.3 | 0.165 | 0.570 |
| Ex. 6-9 | A | 40 | P | 30 | RB | 30 | S-2 | Approx. 160/approx. 160 | 68 | 20.7 | 0.170 | 0.625 |
| Ex. 6-10 | A | 40 | R | 30 | RB | 30 | S-2 | Approx. 160/approx. 160 | 60 | 21.3 | 0.171 | 0.638 |
| Ex. 6-11 | H | 40 | R | 30 | RB | 30 | S-2 | Approx. 160/approx. 160 | 61 | 19.2 | 0.168 | 0.618 |
| Ex. 6-12 | H | 40 | S | 30 | RB | 30 | S-2 | Approx. 160/approx. 160 | 63 | 17.4 | 0.170 | 0.653 |
| Ex. 6-13 | O | 40 | R | 30 | RB | 30 | S-2 | Approx. 160/approx. 160 | 67 | 20.2 | 0.157 | 0.637 |
| Ex. 6-14 | O | 25 | R | 45 | RB | 30 | S-2 | Approx. 160/approx. 160 | 67 | 21.3 | 0.163 | 0.631 |

TABLE 12-continued

| No. | Component A-1 Sample | Component A-1 Ratio (wt. %) | Component A-2 (1) Sample | Component A-2 (1) Ratio (wt. %) | Component A-2 (2) Sample | Component A-2 (2) Ratio (wt. %) | Blending formulation | 1st stage/2nd stage mixing and discharging temperature [°C.]/[°C.] | Processability Viscosity of blend (130° C.) | Tensile strength (MPa) | Fuel-cost-saving performance (Tan δ, 50° C.) | Wet skid resistance (Tan δ, 0° C.) |
|---|---|---|---|---|---|---|---|---|---|---|---|---|
| Ex. 6-15 | L | 40 | S | 30 | RA | 30 | S-2 | Approx. 160/approx. 160 | 63 | 19.7 | 0.163 | 0.602 |
| Ex. 6-16 | L | 30 | RA | 70 | — | — | S-2 | Approx. 160/approx. 160 | 66 | 20.2 | 0.168 | 0.642 |
| Com. Ex. 6-3 | — | — | RA | 70 | RB | 30 | S-2 | Approx. 160/approx. 160 | 65 | 21.7 | 0.214 | 0.582 |
| Com. Ex. 6-4 | — | — | RA | 80 | RD | 20 | S-2 | Approx. 160/approx. 160 | 69 | 20.4 | 0.221 | 0.512 |
| Com. Ex. 6-5 | — | — | P | 80 | RD | 20 | S-2 | Approx. 160/approx. 160 | 74 | 19.5 | 0.185 | 0.546 |
| Com. Ex. 6-6 | — | — | P | 100 | — | — | S-2 | Approx. 160/approx. 160 | 92 | 21.1 | 0.188 | 0.775 |

When the components (A-1) and (A-2) are oil-extended products, only the rubber content not including the amount of the extension oil is indicated by wt. %.

TABLE 13

| No. | Component A-1 Sample | Component A-1 Ratio (wt. %) | Component A-2 Sample | Component A-2 Ratio (wt. %) | Blending formulation | 1st stage/2nd stage mixing and discharging temperature [°C.]/[°C.] | Processability Viscosity of mixture (130° C.) | Tensile strength (MPa) | Fuel-cost-saving performance (Tan δ, 50° C.) |
|---|---|---|---|---|---|---|---|---|---|
| Example 7-1 | M | 40 | RE (Natural rubber) | 60 | S-1 | 160/160 | 52 | 22.3 | 0.102 |
| Example 7-2 | N | 40 | RE (Natural rubber) | 60 | S-1 | 161/158 | 48 | 20.3 | 0.097 |
| Comp. Ex. 7-1 | — | — | RE (Natural rubber) | 100 | S-1 | 162/159 | 45 | 25.5 | 0.125 |

TABLE 14

| No. | Sample | Blending formulation | Silica/Carbon amounts [parts by weight] | 1st stage/2nd stage mixing and discharging temperature [°C.]/[°C.] | Bound rubber content [wt. %] | Processability Viscosity of mixture (130° C.) | Tensile strength (MPa) | Fuel-cost-saving performance (Tan δ, 50° C.) | Wet skid resistance (Tan δ, 0° C.) |
|---|---|---|---|---|---|---|---|---|---|
| Example 8-1 | O | S-2 | 50/20 | 161/159 | 50 | 68 | 21.3 | 0.185 | 0.780 |
| Comp. Ex. 8-1 | Q | S-12 | 0/70 | 161/158 | 35 | 70 | 20.3 | 0.295 | 0.764 |
| Comp. Ex. 8-2 | T | S-2 | 50/20 | 159/159 | 37 | 72 | 19.9 | 0.230 | 0.762 |
| Comp. Ex. 8-3 | X | S-2 | 50/20 | 161/158 | 40 | 74 | 20.5 | 0.205 | 0.758 |
| Comp. Ex. 8-4 | RH | S-12 | 0/70 | 160/160 | 28 | 53 | 20.5 | 0.245 | 0.432 |

TABLE 15

| No. | Sample | Blending formulation | Silica/Carbon amounts [parts by weight] | 1st stage/2nd stage mixing and discharging temperature [°C.]/[°C.] | Bound rubber content [wt. %] | Processability Viscosity of mixture (130° C.) | Tensile strength (MPa) | Fuel-cost-saving performance (Tan δ, 50° C.) | Wet skid resistance (Tan δ, 0° C.) | Remarks |
|---|---|---|---|---|---|---|---|---|---|---|
| Example 9-1 | A | S-3 | 65/5 | 158/158 | 53 | 45 | 17.5 | 0.142 | 0.852 | |
| Example 9-2 | A | S-2 | 50/20 | 161/159 | 53 | 48 | 16.4 | 0.153 | 0.843 | |
| Example 9-3 | A | S-4 | 40/30 | 159/159 | 48 | 48 | 18.3 | 0.185 | 0.813 | |
| Comp. Ex. 9-1 | A | S-13 | 20/50 | 160/161 | 40 | 51 | 18.4 | 0.222 | 0.805 | |

TABLE 15-continued

| No. | Sample | Blending formulation | Silica/Carbon amounts [parts by weight] | 1st stage/2nd stage mixing and discharging temperature [° C.]/[° C.] | Bound rubber content [wt. %] | Processability Viscosity of mixture (130° C.) | Tensile strength (MPa) | Fuel-cost-saving performance (Tan δ, 50° C.) | Wet skid resistance (Tan δ, 0° C.) | Remarks |
|---|---|---|---|---|---|---|---|---|---|---|
| Comp. Ex. 9-2 | A | S-12 | 0/70 | 161/158 | 33 | 50 | 18.5 | 0.242 | 0.800 | |

TABLE 16

| No. | Sample | Blending formulation | 1st stage/2nd stage mixing and discharging temperature [° C.]/[° C.] | Bound rubber content [wt. %] | Processability Viscosity of mixture (130° C.) | Tensile strength (MPa) | Fuel-cost-saving performance (Tan δ, 50° C.) | Wet skid resistance (Tan δ, 0° C.) |
|---|---|---|---|---|---|---|---|---|
| Example 10-1 | U | S-2 | 160/160 | 45 | 70 | 22.6 | 0.227 | 1.025 |
| Example 10-2 | V | S-2 | 161/160 | 48 | 63 | 18.2 | 0.212 | 0.975 |
| Example 10-3 | Z | S-2 | 161/158 | 51 | 68 | 20.2 | 0.202 | 0.995 |
| Comp. Ex. 10-1 | W | S-2 | 159/161 | 32 | 67 | 16.7 | 0.258 | 0.955 |

TABLE 17

| | Component A-1 | | Component A-2 (1) | | Component A-2 (2) | | | 1st stage/2nd stage mixing and discharging temperature [° C.]/[° C.] | Processability Viscosity of mixture (130° C.) | Tensile strength (MPa) | Fuel-cost-saving performance (Tan δ, 50° C.) | Wet skid resistance (Tan δ, 0° C.) |
|---|---|---|---|---|---|---|---|---|---|---|---|---|
| No. | Sample | Ratio (wt. %) | Sample | Ratio (wt. %) | Sample | Ratio (wt. %) | Blending formulation | | | | | |
| Ex. 11-1 | V | 70 | RD | 30 | — | — | S-3 | 158/158 | 65 | 15.9 | 0.142 | 0.465 |
| Ex. 11-2 | V | 35 | RD | 30 | RA | 35 | S-3 | 160/160 | 68 | 18.8 | 0.154 | 0.480 |
| Ex. 11-3 | V | 58 | RD | 22 | RE | 20 | S-3 | 158/158 | 60 | 16.5 | 0.144 | 0.454 |
| Ex. 11-4 | U | 55 | RD | 45 | — | — | S-3 | 159/161 | 71 | 19.6 | 0.157 | 0.524 |
| Ex. 11-5 | U | 35 | RD | 30 | RA | 35 | S-3 | 159/161 | 72 | 20.3 | 0.161 | 0.504 |
| Com. Ex. 11-1 | — | — | RD | 30 | RA | 70 | S-3 | 158/158 | 74 | 21.9 | 0.185 | 0.455 |

When the components (A-1) and (A-2) are oil-extended products, only the rubber content not including the amount of the extension oil is indicated by wt. %.

TABLE 18

| | Component A-1 | | Component A-2 (1) | | Component A-2 (2) | | | 1st stage/2nd stage mixing and discharging temperature [° C.]/[° C.] | Processability Viscosity of mixture (130° C.) | Tensile strength (MPa) | Fuel-cost-saving performance (Tan δ, 50° C.) | Wet skid resistance (Tan δ, 0° C.) |
|---|---|---|---|---|---|---|---|---|---|---|---|---|
| No. | Sample | Ratio (wt. %) | Sample | Ratio (wt. %) | Sample | Ratio (wt. %) | Blending formulation | | | | | |
| Ex. 12-1 | Q | 40 | RF | 20 | RH | 40 | S-5 | 161/159 | 72 | 21.4 | 0.180 | 0.635 |
| Ex. 12-2 | Q | 75 | RG | 25 | — | — | S-5 | 160/160 | 65 | 20.8 | 0.186 | 0.620 |
| Ex. 12-3 | Q | 50 | RA | 25 | RG | 25 | S-5 | 161/160 | 70 | 22.5 | 0.190 | 0.638 |
| Ex. 12-4 | Q | 58 | RH | 42 | — | — | S-5 | 159/158 | 69 | 21.2 | 0.185 | 0.632 |
| Ex. 12-5 | Q | 58 | RC | 42 | — | — | S-5 | 159/158 | 63 | 20.3 | 0.180 | 0.618 |
| Ex. 12-6 | Q | 40 | RA | 30 | RH | 30 | S-5 | 161/160 | 72 | 22.3 | 0.192 | 0.642 |
| Com. Ex. 12-1 | Q | 10 | RA | 50 | RH | 40 | S-5 | 160/158 | 70 | 18.4 | 0.221 | 0.611 |
| Com. Ex. 12-2 | — | — | RA | 60 | RH | 40 | S-5 | 159/157 | 72 | 20.1 | 0.213 | 0.603 |
| Com. Ex. 12-3 | — | — | RA | 60 | RC | 40 | S-5 | 156/156 | 68 | 19.5 | 0.222 | 0.615 |

When the components (A-1) and (A-2) are oil-extended products, only the rubber content not including the amount of the extension oil is indicated by wt. %.

TABLE 19

| No. | Sample | Blending formulation | Heating loss of silica (Mc) [wt. %] | 1st stage/2nd stage mixing and discharging temperature [° C.]/[° C.] | Bound rubber content [wt. %] | Processability Viscosity of mixture (130° C.) | Tensile strength (MPa) | Fuel-cost-saving performance (Tan δ, 50° C.) | Wet skid resistance (Tan δ, 0° C.) |
|---|---|---|---|---|---|---|---|---|---|
| Example 13-1 | J | S-2 | 2.2 | 141/138 | 44 | 42 | 21.7 | 0.153 | 0.911 |
| Example 13-2 | J | S-2 | 2.2 | 150/150 | 48 | 50 | 20.8 | 0.148 | 0.922 |
| Example 13-3 | J | S-2 | 1.1 | 141/139 | 41 | 43 | 22.0 | 0.152 | 0.887 |
| Example 13-4 | J | S-2 | 4.8 | 150/155 | 57 | 48 | 19.1 | 0.132 | 0.966 |
| Example 13-5 | J | S-2 | 6.5 | 169/169 | 59 | 52 | 19.3 | 0.130 | 0.982 |
| Example 13-6 | J | S-2 | 6.5 | 175/170 | 64 | 58 | 17.9 | 0.112 | 1.025 |
| Example 13-7 | J | S-2 | 8.2 | 167/168 | 55 | 50 | 19.8 | 0.134 | 0.968 |
| Example 13-8 | J | S-2 | 4.8 | 142/140 | 38 | 38 | 19.4 | 0.178 | 0.838 |

TABLE 20

| No. | Sample | Blending formulation | Amount of organosilane coupling agent (parts by weight) | 1st stage/2nd stage mixing and discharging temperature [° C.]/[° C.] | Bound rubber content [wt. %] | Processability Viscosity of mixture (130° C.) | 300% Modulus (Mpa) | Tensile strength (MPa) | Fuel-cost-saving performance (Tan δ, 50° C.) | Wet skid resistance (Tan δ, 0° C.) |
|---|---|---|---|---|---|---|---|---|---|---|
| Ex. 14-1 | J | S-5 | 3 | 160/162 | 54 | 48 | 11.0 | 19.7 | 0.127 | 0.945 |
| Ex. 14-2 | J | S-6 | 1 | 161/161 | 57 | 50 | 11.8 | 19.1 | 0.128 | 0.957 |
| Ex. 14-3 | J | S-7 | 0 | 160/160 | 48 | 62 | 10.2 | 16.5 | 0.165 | 0.900 |
| Ex. 14-4 | Q | S-5 | 3 | 160/161 | 60 | 72 | 12.9 | 21.5 | 0.136 | 0.895 |
| Ex. 14-5 | Q | S-6 | 1 | 158/161 | 61 | 76 | 14.0 | 21.3 | 0.134 | 0.887 |
| Ex. 14-6 | Q | S-3 | 6 | 160/160 | 57 | 71 | 12.5 | 22.2 | 0.170 | 0.800 |
| Com. Ex. 14-1 | F | S-5 | 3 | 159/160 | 30 | 55 | 10.1 | 17.0 | 0.198 | 0.711 |
| Com. Ex. 14-2 | F | S-6 | 1 | 162/162 | 27 | 60 | 10.3 | 16.9 | 0.205 | 0.702 |
| Com. Ex. 14-3 | F | S-3 | 6 | 158/158 | 33 | 42 | 8.9 | 17.7 | 0.195 | 0.715 |

TABLE 21

| No. | Sample | Blending formulation | 1st stage/2nd stage mixing and discharging temperature [° C.]/[° C.] | Bound rubber content [wt. %] | Processability Viscosity of mixture (130° C.) | 300% Modulus (Mpa) | Tensile strength (MPa) | Fuel-cost-saving performance (Tan δ, 50° C.) | Wet skid resistance (Tan δ, 0° C.) |
|---|---|---|---|---|---|---|---|---|---|
| Example 15-1 | BA | S-3 | 158/159 | 40 | 41 | 9.8 | 20.3 | 0.121 | 0.925 |
| Example 15-2 | BA | S-5 | 158/159 | 46 | 45 | 12.2 | 19.6 | 0.113 | 0.951 |
| Example 15-3 | BB | S-3 | 160/160 | 43 | 44 | 10.2 | 20.0 | 0.118 | 0.930 |
| Example 15-4 | BB | S-5 | 160/161 | 50 | 47 | 12.4 | 19.9 | 0.110 | 0.968 |
| Example 15-5 | BC | S-3 | 158/158 | 42 | 42 | 11.4 | 19.8 | 0.117 | 0.953 |
| Example 15-6 | BD | S-5 | 160/160 | 54 | 43 | 11.0 | 19.7 | 0.127 | 0.945 |
| Comp. Ex. 15-1 | BE | S-3 | 158/158 | 32 | 42 | 8.9 | 17.7 | 0.205 | 0.705 |
| Comp. Ex. 15-2 | RB | S-3 | 158/160 | 29 | 45 | 7.9 | 20.3 | 0.216 | 0.380 |

TABLE 22

| No. | Sample | Blending formulation | 1st stage/2nd stage mixing and discharging temperature [°C.]/[°C.] | Bound rubber content [wt. %] | Processability Viscosity of mixture (130° C.) | 300% Modulus (MPa) | Tensile strength (MPa) | Fuel-cost-saving performance (Tan δ, 50° C.) | Wet skid resistance (Tan δ, 0° C.) |
|---|---|---|---|---|---|---|---|---|---|
| Example 16-1 | AA | S-5 | 161/162 | 55 | 64 | 12.4 | 21.8 | 0.126 | 0.904 |
| Example 16-2 | AB | S-5 | 159/159 | 52 | 72 | 12.1 | 21.3 | 0.135 | 0.864 |
| Example 16-3 | AC | S-5 | 161/161 | 54 | 70 | 13.5 | 19.3 | 0.140 | 1.042 |
| Com. Ex. 16-1 | T | S-5 | 159/159 | 42 | 68 | 11.2 | 20.2 | 0.200 | 0.820 |
| Com. Ex. 16-2 | Y | S-5 | 160/160 | 40 | 65 | 10.9 | 19.7 | 0.202 | 0.810 |
| Example 16-4 | AA/RD = 80/20 | S-5 | 161/162 | 52 | 59 | 9.9 | 22.9 | 0.142 | 0.559 |
| Example 16-5 | AB/RD = 80/20 | S-5 | 159/162 | 51 | 61 | 9.8 | 21.5 | 0.140 | 0.562 |
| Com. Ex. 16-3 | X/RD = 80/20 | S-5 | 158/160 | 43 | 60 | 9.2 | 19.5 | 0.175 | 0.540 |
| Example 16-5 | BA/RA = 40/60 | S-5 | 159/161 | 54 | 60 | 10.3 | 22.2 | 0.138 | 0.850 |

TABLE 23

| No. | Component (A-1) (1) Sample | Component (A-1) (1) Ratio (wt. %) | Component (A-1) (2) Sample | Component (A-1) (2) Ratio (wt. %) | Blending formulation | 1st stage/2nd stage mixing and discharging temperature [°C.]/[°C.] | Bound rubber content [wt. %] | Processability Viscosity of mixture (130° C.) | 300% Modulus (MPa) | Tensile strength (MPa) | Fuel-cost-saving performance (Tan δ, 50° C.) | Wet skid resistance (Tan δ, 0° C.) |
|---|---|---|---|---|---|---|---|---|---|---|---|---|
| Ex. 17-1 | A | 60 | Q | 40 | S-3 | 160/159 | 53 | 55 | 12.5 | 18.5 | 0.140 | 0.852 |
| Ex. 17-2 | A | 60 | AA | 40 | S-3 | 160/159 | 55 | 55 | 12.8 | 19.7 | 0.115 | 0.883 |
| Ex. 17-3 | A | 30 | AA | 70 | S-3 | 160/160 | 55 | 65 | 13.5 | 20.9 | 0.114 | 0.884 |
| Ex. 17-4 | BA | 30 | Q | 70 | S-3 | 160/161 | 52 | 64 | 13.2 | 20.4 | 0.128 | 0.895 |
| Ex. 17-5 | BA | 30 | AA | 70 | S-3 | 159/158 | 58 | 67 | 13.3 | 21.2 | 0.118 | 0.905 |

INDUSTRIAL APPLICABILITY

Provided is a vulcanized rubber composition for tire tread having good strength properties, processability, fuel-cost-saving performance and gripping performance by using a styrene-butadiene rubber having a specific structure of the invention in accordance with a specific blending formulation containing a reinforcing silica filler. The invention makes it possible to reduce the amount of a silane coupling agent necessary for obtaining a silica-containing composition. This vulcanized rubber composition for tires is useful as an automobile tire material requiring fuel-cost-saving performance.

What is claimed:

1. A process for producing a rubbery polymer having a high modification ratio through reaction of a diene polymer having an active end and a modifier, comprising the steps of:
   reacting impurities contained in a monomer and a solvent with an organic metal compound to inactivate the impurities;
   feeding the monomer and solvent into a polymerization reactor; and
   carrying out polymerization.

2. The process according to claim 1 wherein an amount of all the impurities in the monomer and solvent to be fed to the polymerization reactor is reduced to less than 0.40 equivalent based on an initiator to be fed to the polymerization reactor, and the rubber polymer obtained contains a modified component in an amount exceeding 60 wt. %.

3. The process according to claim 1, wherein the modifier is a polyfunctional compound having at least two epoxy groups in its molecule.

4. The process according to claim 2, wherein the modifier is a polyfunctional compound having at least two epoxy groups in its molecule.

5. The process according to claim 1, wherein the modifier is a polyfunctional compound having at least two epoxy groups and at least one nitrogen atom in its molecule.

6. The process according to claim 2, wherein the modifier is a polyfunctional compound having at least two epoxy groups and at least one nitrogen atom in its molecule.

7. The process according to claim 1, wherein the modifier is represented by the following formula:

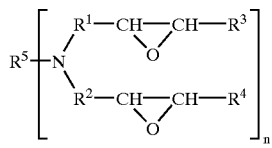

wherein, $R^1$ and $R^2$ each independently represents a $C_{1-10}$ hydrocarbon group or a $C_{1-10}$ hydrocarbon group having an ether or a tertiary amine, $R^3$ and $R^4$ each independently represents hydrogen, a $C_{1-20}$ hydrocarbon group or a $C_{1-20}$ hydrocarbon group having an ether or tertiary amine, $R^5$ represents a $C_{1-12}$ hydrocarbon group or a $C_{1-12}$ hydrocarbon group having at least one group selected from ethers, tertiary amines, epoxy, carbonyl and halogens, and n stands for 1 to 6.

8. The process according to claim 2, wherein the modifier is represented by the following formula:

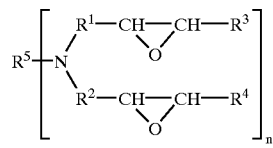

wherein, $R^1$ and $R^2$ each independently represents a $C_{1-10}$ hydrocarbon group or a $C_{1-10}$ hydrocarbon group having an ether or a tertiary amine, $R^3$ and $R^4$ each independently represents hydrogen, a $C_{1-20}$ hydrocarbon group or a $C_{1-20}$ hydrocarbon group having an ether or tertiary amine, $R^5$ represents a $C_{1-12}$ hydrocarbon group or a $C_{1-12}$ hydrocarbon group having at least one group selected from ethers, tertiary amines, epoxy, carbonyl and halogens, and n stands for 1 to 6.

* * * * *